United States Patent
Nettenstrom et al.

(10) Patent No.: US 10,433,584 B2
(45) Date of Patent: Oct. 8, 2019

(54) RE-CHARGING PACK FOR AN E-CIGARETTE

(71) Applicant: NICOVENTURES HOLDINGS LIMITED, London (GB)

(72) Inventors: Matthew Joel Nettenstrom, Oakbrook Terrace, IL (US); Steven Michael Schennum, Oakbrook Terrace, IL (US); Deon Ding, Futian District Guangdong (CN); Ryan Zhang, Futian District Guangdong (CN)

(73) Assignee: Nicoventures Holdings Limited, London (GB)

( * ) Notice: Subject to any disclaimer, the term of this patent is extended or adjusted under 35 U.S.C. 154(b) by 0 days.

(21) Appl. No.: 15/328,730

(22) PCT Filed: Jul. 24, 2015

(86) PCT No.: PCT/GB2015/052155
§ 371 (c)(1),
(2) Date: Jan. 24, 2017

(87) PCT Pub. No.: WO2016/012811
PCT Pub. Date: Jan. 28, 2016

(65) Prior Publication Data
US 2017/0208865 A1     Jul. 27, 2017

(30) Foreign Application Priority Data

Jul. 24, 2014 (CN) .......................... 2014 1 0354337
Jul. 29, 2014 (GB) ..................................... 1413429

(51) Int. Cl.
*A24F 13/00*     (2006.01)
*A24F 17/00*     (2006.01)
(Continued)

(52) U.S. Cl.
CPC .............. *A24F 47/008* (2013.01); *A24F 9/16* (2013.01); *A24F 15/18* (2013.01); *B65D 25/10* (2013.01);
(Continued)

(58) Field of Classification Search
CPC ..... A24F 47/002; A24F 47/004; A24F 47/008
(Continued)

(56) References Cited

U.S. PATENT DOCUMENTS

D53,386 S    5/1919 Thomas
2,522,952 A  9/1950 Krohn
(Continued)

FOREIGN PATENT DOCUMENTS

CA    2862045        7/2013
CN    201299102 Y    9/2009
(Continued)

OTHER PUBLICATIONS

Application and File History for U.S. Appl. No. 15/328,099, filed Jan. 23, 2017, Inventors: Schennum et al.
(Continued)

*Primary Examiner* — Abdullah A Riyami
*Assistant Examiner* — Thang Nguyen
(74) *Attorney, Agent, or Firm* — Patterson Thuente Pedersen, P.A.

(57) ABSTRACT

A pack holds and re-charges an e-cigarette which has a tip connector with first and second charging contacts. The pack includes a pack battery; a body including a tube having an open first end for receiving the e-cigarette; and a connection assembly which is positioned at a second opposite end of the tube and includes a connector with a central contact and an outer contact for re-charging the e-cigarette using the pack battery. The outer contact of the connection assembly comprises a generally annular base and at least two lugs which (Continued)

project from the base in the direction of the first end of the tube and which define a docking station between the lugs for receiving the tip connector of the e-cigarette. The base of the outer contact is spring-mounted, such as by a spring, relative to a housing, of the connection assembly.

15 Claims, 19 Drawing Sheets

(51) Int. Cl.
| | | |
|---|---|---|
| *A24F 25/00* | (2006.01) | |
| *A24F 47/00* | (2006.01) | |
| *H01M 2/30* | (2006.01) | |
| *A24F 15/18* | (2006.01) | |
| *A24F 9/16* | (2006.01) | |
| *B65D 25/10* | (2006.01) | |
| *B65D 43/16* | (2006.01) | |
| *H02J 7/00* | (2006.01) | |
| *H01R 13/24* | (2006.01) | |

(52) U.S. Cl.
CPC ............ *B65D 43/163* (2013.01); *H01M 2/30* (2013.01); *H02J 7/0045* (2013.01); *H01R 13/2421* (2013.01)

(58) Field of Classification Search
USPC .......................................................... 131/329
See application file for complete search history.

(56) References Cited

U.S. PATENT DOCUMENTS

| | | | |
|---|---|---|---|
| 4,214,658 A | 7/1980 | Crow | |
| D279,508 S | 7/1985 | Bauer et al. | |
| 4,947,874 A | 8/1990 | Brooks | |
| 5,044,550 A | 9/1991 | Lamm | |
| D322,687 S | 12/1991 | Tschudin | |
| D346,878 S | 5/1994 | Gee et al. | |
| 5,530,225 A | 6/1996 | Hajaligol | |
| 5,558,429 A | 9/1996 | Cain | |
| 5,649,554 A | 7/1997 | Spinkel | |
| D392,069 S | 3/1998 | Rowland | |
| D414,892 S | 10/1999 | Chen | |
| 6,012,459 A | 1/2000 | Keefe | |
| D436,725 S | 1/2001 | Rogers | |
| D441,133 S | 4/2001 | Emery | |
| D449,521 S | 10/2001 | Pinkus et al. | |
| 6,446,793 B1 | 9/2002 | Layshock | |
| 6,530,495 B1 | 3/2003 | Joseph | |
| 6,637,430 B1 | 10/2003 | Voges | |
| D566,329 S | 4/2008 | Bagaric et al. | |
| D566,890 S | 4/2008 | Bagaric | |
| 7,455,176 B2 | 11/2008 | Focke | |
| D631,838 S | 2/2011 | Cheng | |
| D650,738 S | 2/2011 | Leung | |
| 8,448,783 B2 | 5/2013 | Veechi | |
| D690,461 S | 9/2013 | Chen | |
| D693,055 S | 11/2013 | Manca et al. | |
| D700,397 S | 2/2014 | Manca et al. | |
| 8,794,245 B1 | 8/2014 | Scatterday | |
| D715,760 S | 10/2014 | Kim | |
| D716,267 S | 10/2014 | Kim | |
| D720,884 S | 1/2015 | Liu | |
| D723,738 S | 3/2015 | Liu | |
| 8,975,764 B1* | 3/2015 | Abehasera | ................ F03G 7/08 128/202.21 |
| 8,978,663 B2 | 3/2015 | Newton | |
| D736,460 S | 8/2015 | McKeon et al. | |
| D737,507 S | 8/2015 | Liu | |
| 9,302,825 B2 | 4/2016 | Liu | |
| 9,499,332 B2 | 11/2016 | Fernando | |
| 9,603,388 B2 | 3/2017 | Fernando | |
| 2006/0196518 A1 | 9/2006 | Hon | |
| 2008/0121244 A1 | 5/2008 | Bryman | |
| 2009/0283103 A1 | 11/2009 | Nielsen | |
| 2011/0162663 A1 | 7/2011 | Bryman | |
| 2011/0265806 A1 | 11/2011 | Alarcon | |
| 2012/0227753 A1* | 9/2012 | Newton | ................ A24F 47/008 131/347 |
| 2012/0255567 A1* | 10/2012 | Rose | ........................ A61K 9/12 131/273 |
| 2013/0098786 A1 | 4/2013 | Collins | |
| 2013/0298922 A1 | 11/2013 | Xiang | |
| 2013/0300350 A1 | 11/2013 | Zhiyong | |
| 2013/0333711 A1 | 12/2013 | Liu | |
| 2013/0341218 A1 | 12/2013 | Liu | |
| 2013/0342157 A1 | 12/2013 | Liu | |
| 2014/0007892 A1 | 1/2014 | Liu | |
| 2014/0014124 A1 | 1/2014 | Glasberg | |
| 2014/0020697 A1 | 1/2014 | Liu | |
| 2014/0053858 A1 | 2/2014 | Liu | |
| 2014/0083443 A1 | 3/2014 | Liu | |
| 2014/0097103 A1 | 4/2014 | Cameron | |
| 2014/0107815 A1 | 4/2014 | Lamothe | |
| 2014/0196731 A1 | 7/2014 | Scatterday | |
| 2014/0286002 A1 | 9/2014 | Liu | |
| 2015/0020831 A1* | 1/2015 | Weigensberg | ........ A24F 47/008 131/329 |
| 2015/0114410 A1 | 4/2015 | Doster | |
| 2015/0128975 A1 | 5/2015 | Alarcon | |
| 2015/0201676 A1 | 7/2015 | Shin | |
| 2015/0245654 A1* | 9/2015 | Memari | ................... A24F 15/12 141/2 |
| 2015/0333542 A1* | 11/2015 | Alarcon | .................. H02J 7/007 131/328 |
| 2015/0333552 A1* | 11/2015 | Alarcon | ................ H02J 7/0052 131/329 |
| 2015/0333561 A1* | 11/2015 | Alarcon | ................ H02J 7/0042 131/329 |
| 2016/0250201 A1* | 9/2016 | Rose | .................. A61K 31/4439 131/329 |
| 2016/0278436 A1* | 9/2016 | Verleur | ................. A24F 47/008 |
| 2017/0114965 A1* | 4/2017 | Maglica | .................... F21L 4/08 |
| 2017/0208865 A1 | 7/2017 | Nettenstrom | |
| 2018/0199618 A1* | 7/2018 | Fuisz | ....................... A24B 15/32 |

FOREIGN PATENT DOCUMENTS

| | | | | |
|---|---|---|---|---|
| CN | 201571500 U | | 9/2010 | |
| CN | 101869356 A | | 10/2010 | |
| CN | 201384062 Y | | 10/2010 | |
| CN | 201928066 U | | 8/2011 | |
| CN | 2012122096 U | | 1/2012 | |
| CN | 203416029 U | | 1/2014 | |
| CN | 203481880 U | | 3/2014 | |
| CN | 203481882 U | | 3/2014 | |
| CN | 203491758 U | | 3/2014 | |
| CN | 203504217 | | 3/2014 | |
| CN | 203504250 U | | 3/2014 | |
| CN | 203537022 U | * | 4/2014 | ............. A24F 7/002 |
| CN | 203554013 U | | 4/2014 | |
| CN | 103798960 | | 5/2014 | |
| EP | 2253233 A1 | | 11/2010 | |
| EP | 2157873 B1 | | 7/2011 | |
| EP | 2573900 A1 | | 3/2013 | |
| EP | 2668858 A1 | | 12/2013 | |
| GB | 1046183 | | 7/1988 | |
| GB | 2068034 | | 11/1997 | |
| GB | 4000273 | | 12/2006 | |
| GB | 4006615 | | 10/2008 | |
| KR | 200448273 Y1 | | 3/2010 | |
| KZ | 27104 B | | 6/2013 | |
| RU | 103281 U1 | | 4/2011 | |
| RU | 2489948 C2 | | 8/2013 | |
| WO | WO2006082571 A1 | | 8/2006 | |
| WO | WO 2013/102612 | | 7/2013 | |
| WO | WO 2014/017794 | | 1/2014 | |

OTHER PUBLICATIONS

International Preliminary Report on Patentability, Application No. PCT/GB2015/052129, dated Jan. 24, 2017, 7 pages.

(56) References Cited

OTHER PUBLICATIONS

Translation of Russian Search Report, Application No. 2017101966, dated Jan. 30, 2018, 2 pages.
Office Action dated Sep. 3, 2014, for Russian Application No. 2013504605, 7 pages.
Notification of International Preliminary Report on Patentability, Application No. PCT/GB2015/050957, dated Oct. 13, 2016, 9 pages.
Search Report for corresponding GB Application No. 1405719.4 dated Aug. 29, 2014; 4 pages.
International Search Report for corresponding International Application No. PCT/GB2015/050957 dated Jul. 24, 2015; 6 pages.
Written Opinion for corresponding International Application No. PCT/GB2015/050957 dated Jul. 24, 2015; 7 pages.
International Search Report for corresponding International Application No. PCT/GB2015/050956 dated Jul. 24, 2015, 5 pages.
Written Opinion for corresponding International Application No. PCT/GB2015/050956 dated Jul. 24, 2015, 8 pages.
International Preliminary Report on Patentability for corresponding International Application No. PCT/GB2015/050956 dated Jul. 8, 2016, 16 pages.
Search Report for corresponding GB Application No. 1405721.0 dated Sep. 23, 2014, 5 pages.
International Search Report and Written Opinion, International Application No. PCT/GB2015/052129, dated Sep. 7, 2015, 10 pages.
EP Search Report, Application No. GB1413127.7, dated Jan. 22, 2015, 5 pages.
Application and File History for U.S. Appl. No. 15/301,105, filed Sep. 30, 2016, Inventors: Schennum.
Application and File History for U.S. Appl. No. 15/301,178, filed Sep. 30, 2016, Inventors: Schennum.
Great Britain Examination Report, Application No. GB1413429.0, dated May 1, 2018, 4 pages.
Russian Decision to Grant, Application No. 2017102047/07, dated Mar. 20, 2018, 13 pages.
Great Britain Examination Report, Application No. GB1413429.0, dated Sep. 27, 2017, 3 pages.
Chinese Office Action, Application No. 201580018258.7, dated May 3, 2018, 8 pages (15 pages with translation).
Russian Decision to Grant, Application No. 2016138630, dated Dec. 21, 2017, 9 pages.
Chinese Office Action, Application No. 201580040920.9, dated Aug. 28, 2018, 5 pages.
Chinese Office Action, Application No. 201580041176.4, dated Oct. 19, 2018, 5 pages.
European Extended Search Report, Application No. EP18199904, dated Mar. 1, 2019, 16 pages.

* cited by examiner

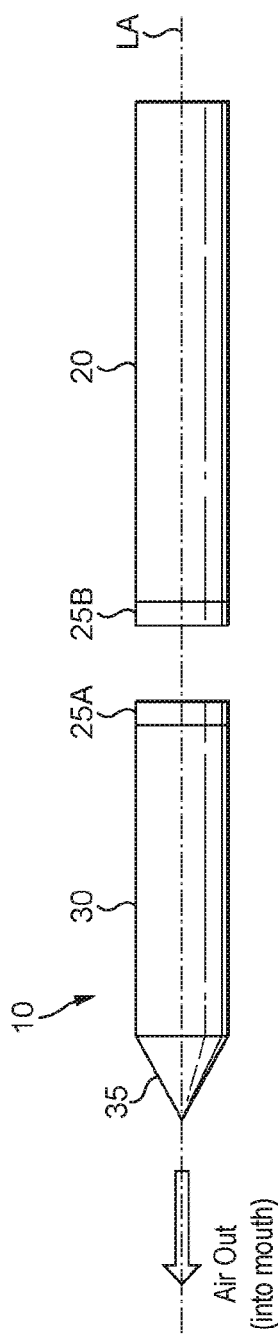
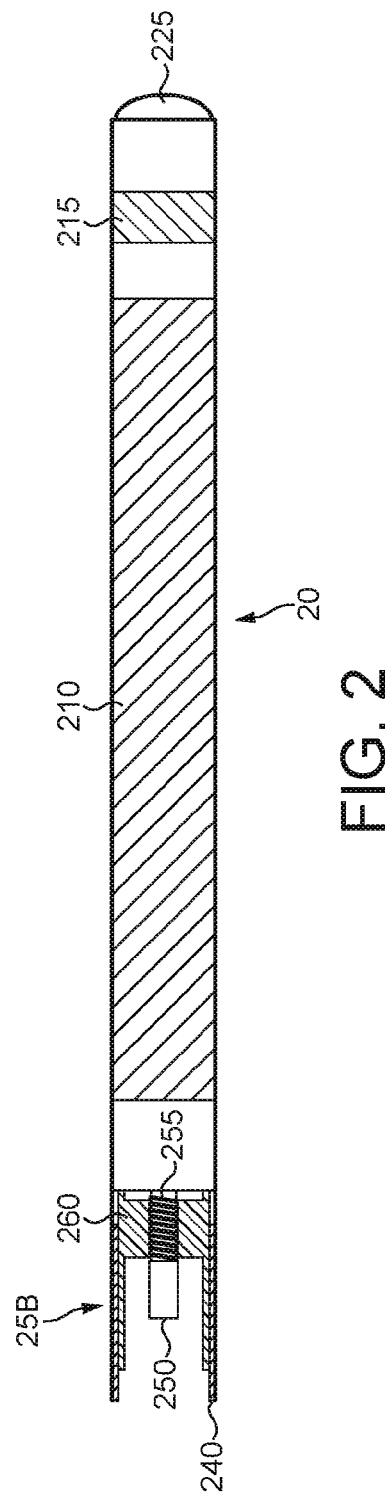

RE-CHARGING PACK FOR AN E-CIGARETTE

CROSS-REFERENCE TO RELATED APPLICATIONS

The present application is a National Phase entry of PCT Application No. PCT/GB2015/052155, filed Jul. 24, 2015, which claims priority from CN Patent Application No. 201410354337.2, filed Jul. 24, 2014, and GB Patent Application No. 1413429.0, filed Jul. 29, 2014, each of which is hereby fully incorporated herein by reference.

TECHNICAL FIELD

The present application relates to a re-charging pack for an e-cigarette, such as an electronic vapor provision system or an electronic nicotine delivery system.

BACKGROUND

Electronic vapor provision systems, electronic nicotine delivery systems, etc., which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Typically a pack is provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during re-charging, thereby providing greater convenience for a user.

The pack battery will be depleted in due course, and so is generally provided with its own re-charging facility—typically again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply).

It is desirable for the operation of (re)charging of an e-cigarette and associated pack to be as safe, reliable and convenient for a user as possible.

SUMMARY

Various embodiments provide a pack for holding and re-charging an e-cigarette which has a tip connector with first and second charging contacts. The pack comprises a pack battery; a body including a tube having an open first end for receiving an e-cigarette; and a connection assembly which is positioned at a second opposite end of the tube and includes a connector with a central contact and an outer contact for re-charging the e-cigarette using the pack battery. The outer contact of the connection assembly comprises a generally annular base and at least two lugs which project from the base in the direction of the first end of the tube and which define a docking station between the lugs for receiving the tip connector of the e-cigarette. The base of the outer contact is spring-mounted relative to a housing of the connection assembly.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments of the disclosure will now be described in detail by way of example only with reference to the following drawings:

FIG. 1 is a schematic (exploded) diagram of an e-cigarette in accordance with some embodiments of the disclosure.

FIG. 2 is a schematic (simplified) diagram of a body of the e-cigarette of FIG. 1 in accordance with some embodiments of the disclosure.

DETAILED DESCRIPTION

Figure 3:
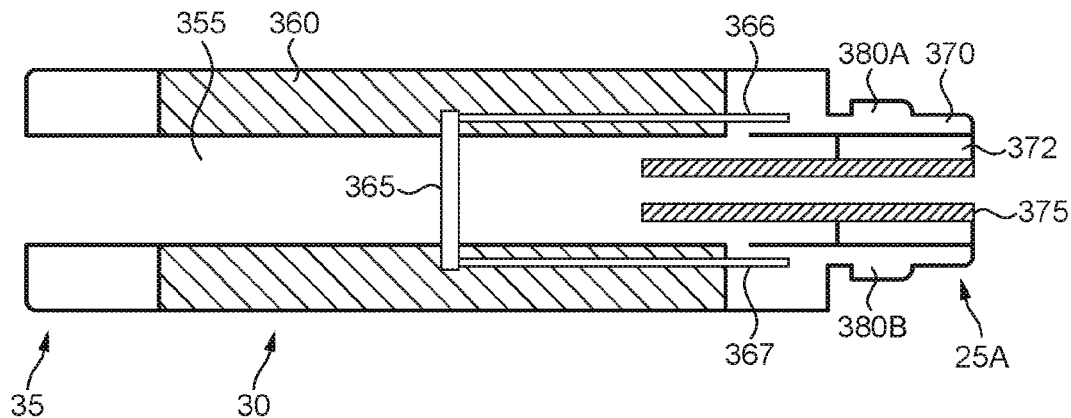
FIG. 3 is a schematic diagram of a cartomizer of the e-cigarette of FIG. 1 in accordance with some embodiments of the disclosure.

FIG. 1 is a schematic diagram of an electronic vapor provision system such as an e-cigarette 10 in accordance with some embodiments of the disclosure (not to scale). The e-cigarette 10 has a generally cylindrical shape, extending along a longitudinal axis indicated by dashed line LA, and comprises two main components, namely a body 20 and a cartomizer 30. The cartomizer 30 includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes the heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette. When the heater receives power from the battery, as controlled by the circuit board, the heater vaporizes the nicotine and this vapor is then inhaled by a user through the mouthpiece 35.

The body 20 and cartomizer 30 are detachable from one another by separating in a direction parallel to the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector on the body 20 that is used to connect to the cartomizer 30 also serves as a socket for connecting a charging device (not shown) when the body 20 is detached from the cartomizer 30. The other end of the charging device can be plugged into a USB socket to re-charge the cell in the body of the e-cigarette 10. In other implementations, a cable may be provided for direct connection between the electrical connector on the body 20 and a USB socket.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece 35 (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

FIG. 2 is a schematic (simplified) diagram of the body 20 of the e-cigarette 10 of FIG. 1 in accordance with some embodiments of the disclosure. FIG. 2 can generally be regarded as a cross-section in a plane through the longitudinal axis LA of the e-cigarette. Note that various components and details of the body 20, e.g. such as wiring and more complex shaping, have been omitted from FIG. 2 for reasons of clarity.

As shown in FIG. 2, the body 20 includes a battery or cell 210 for powering the e-cigarette 10, as well as a chip, such as an application specific integrated circuit (ASIC) or microcontroller for controlling the e-cigarette 10. The ASIC may be positioned alongside or at one end of the battery 210. The ASIC is attached to a sensor unit 215 to detect an inhalation on mouthpiece 35 (or alternatively the sensor unit 215 may be provided on the ASIC itself). In response to such a detection, the ASIC provides power from the battery or cell 210 to a heater in the cartomizer to vaporize nicotine into the airflow which is inhaled by a user.

The body 20 further includes a cap 225 to seal and protect the far (distal) end of the e-cigarette 10. There is an air inlet hole provided in or adjacent to the cap 225 to allow air to enter the body 20 and flow past the sensor unit 215 when a user inhales on the mouthpiece 35. This airflow therefore allows the sensor unit 215 to detect the user inhalation. The cap 225 may also comprise a pair of electrical contacts which allow the e-cigarette 10 to be charged using these electrical contacts (in addition to, or instead of, USB charging or the like using the connector 25B). This is explained in more detail below.

At the opposite end of the body 20 from the cap 225 is the connector 25B for joining the body 20 to the cartomizer 30. The connector 25B provides mechanical and electrical connectivity between the body 20 and the cartomizer 30. The connector 25B includes a body connector 240, which is metallic (silver-plated in some embodiments) to serve as one terminal for electrical connection (positive or negative) to the cartomizer 30. The connector 25B further includes an electrical contact 250 to provide a second terminal for electrical connection to the cartomizer 30 of opposite polarity to the first terminal, namely body connector 240. The electrical contact 250 is mounted on a coil spring 255. When the body 20 is attached to the cartomizer 30, the connector 25A on the cartomizer pushes against the electrical contact 250 in such a manner as to compress the coil spring in an axial direction, i.e. in a direction parallel to (co-aligned with) the longitudinal axis LA. In view of the resilient nature of the spring 255, this compression biases the spring 255 to expand, which has the effect of pushing the electrical contact 250 firmly against connector 25A, thereby helping to ensure good electrical connectivity between the body 20 and the cartomizer 30. The body connector 240 and the electrical contact 250 are separated by a trestle 260, which is made of a non-conductor (such as plastic) to provide good insulation between the two electrical terminals. The trestle 260 is shaped to assist with the mutual mechanical engagement of connectors 25A and 25B.

FIG. 3 is a schematic diagram of the cartomizer 30 of the e-cigarette 10 of FIG. 1 in accordance with some embodiments of the disclosure. FIG. 3 can generally be regarded as a cross-section in a plane through the longitudinal axis LA of the e-cigarette 10. Note that various components and details of the body 20, e.g. such as wiring and more complex shaping, have been omitted from FIG. 3 for reasons of clarity.

The cartomizer 30 includes an air passage 355 extending along the central (longitudinal) axis of the cartomizer 30 from the mouthpiece 35 to the connector 25A for joining the cartomizer 30 to the body 20. A reservoir of nicotine 360 is provided around the air passage 335. This reservoir 360 may be implemented, for example, by providing cotton or foam soaked in nicotine. The cartomizer 30 also includes a heater 365 for heating nicotine from reservoir 360 to generate nicotine vapor to flow through air passage 355 and out through mouthpiece 35 in response to a user inhaling on the e-cigarette 10. The heater 365 is powered through lines 366 and 367, which are in turn connected to opposing polarities (positive and negative, or vice versa) of the battery 210 via connector 25A (the details of the wiring between the power lines 366 and 367 and connector 25A are omitted from FIG. 3).

The connector 25A includes an inner electrode 375, which may be silver-plated or made of some other suitable metal. When the cartomizer 30 is connected to the body 20, the inner electrode 375 contacts the electrical contact 250 of the body 20 to provide a first electrical path between the cartomizer 30 and the body 20. In particular, as the connectors 25A and 25B are engaged, the inner electrode 375 pushes against the electrical contact 250 so as to compress the coil spring 255, thereby helping to ensure good electrical contact between the inner electrode 375 and the electrical contact 250.

The inner electrode 375 is surrounded by an insulating ring 372, which may be made of plastic, rubber, silicone, or any other suitable material. The insulating ring 372 is surrounded by the cartomizer connector 370, which may be silver-plated or made of some other suitable metal or conducting material. When the cartomizer 30 is connected to the body 20, the cartomizer connector 370 contacts the body connector 240 of the body 20 to provide a second electrical path between the cartomizer 30 and the body 20. In other words, the inner electrode 375 and the cartomizer connector 370 serve as positive and negative terminals (or vice versa) for supplying power from the battery 210 in the body 20 to the heater 365 in the cartomizer 30 via supply lines 366 and 367 as appropriate.

The cartomizer connector 370 is provided with two lugs or tabs 380A, 380B, which extend in opposite directions away from the longitudinal axis of the e-cigarette 10. These tabs are used to provide a bayonet fitting in conjunction with the body connector 240 for connecting the cartomizer 30 to the body 20. This bayonet fitting provides a secure and robust connection between the cartomizer 30 and the body 20, so that the cartomizer 30 and body 20 are held in a fixed position relative to one another, without wobble or flexing, and the likelihood of any accidental disconnection is very small. At the same time, the bayonet fitting provides simple and rapid connection and disconnection by an insertion followed by a rotation for connection, and a rotation (in the reverse direction) followed by withdrawal for disconnection. It will be appreciated that other embodiments may use a different form of connection between the body 20 and the cartomizer 30, such as a snap fit or a screw connection.

Figure 4:
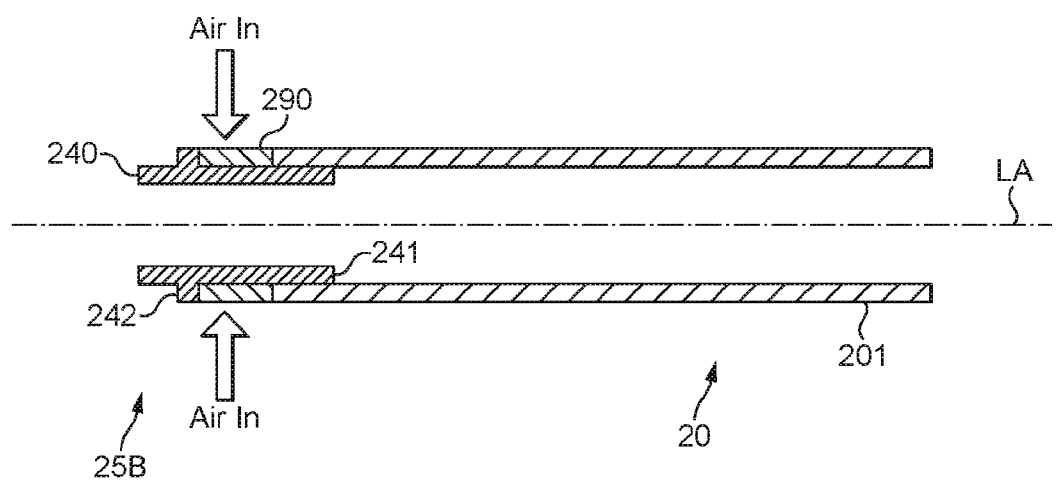
FIG. 4 is a schematic diagram of certain details of a connector at one end of the body of the e-cigarette of FIG. 1 in accordance with some embodiments of the disclosure.

FIG. 4 is a schematic diagram of certain details of the connector 25B at the end of the body 20 in accordance with some embodiments of the disclosure (but omitting for clarity most of the internal structure of the connector as shown in FIG. 2, such as trestle 260). In particular, FIG. 4 shows the external housing 201 of the body 20, which generally has the form of a cylindrical tube. This external housing 201 may comprise, for example, an inner tube of metal with an outer covering of paper or similar.

The body connector 240 extends from this external housing 201 of the body 20. The body connector 240 as shown in FIG. 4 comprises two main portions, a shaft portion 241 in the shape of a hollow cylindrical tube, which is sized to fit just inside the external housing 201 of the body 20, and a lip portion 242 which is directed in a radially outward direction, away from the main longitudinal axis (LA) of the e-cigarette 10. Surrounding the shaft portion 241 of the body connector 240, where the shaft portion 241 does not overlap with the external housing 201, is a collar or sleeve 290, which is again in a shape of a cylindrical tube. The collar 290 is retained between the lip portion 242 of the body connector 240 and the external housing 201 of the body 20, which together prevent movement of the collar 290 in an axial direction (i.e. parallel to axis LA). However, collar 290 may be free to rotate around the shaft portion 241 (and hence also axis LA).

As mentioned above, the cap 225 is provided with an air inlet hole to allow air to flow past sensor 215 when a user inhales on the mouthpiece 35. However, the majority of air that enters the device 10 when a user inhales flows through collar 290 and body connector 240 as indicated by the two arrows in FIG. 4. (The collar 290 and the body connector 240 are provided with holes, not shown in FIG. 4, to support such airflow.)

Figure 5:
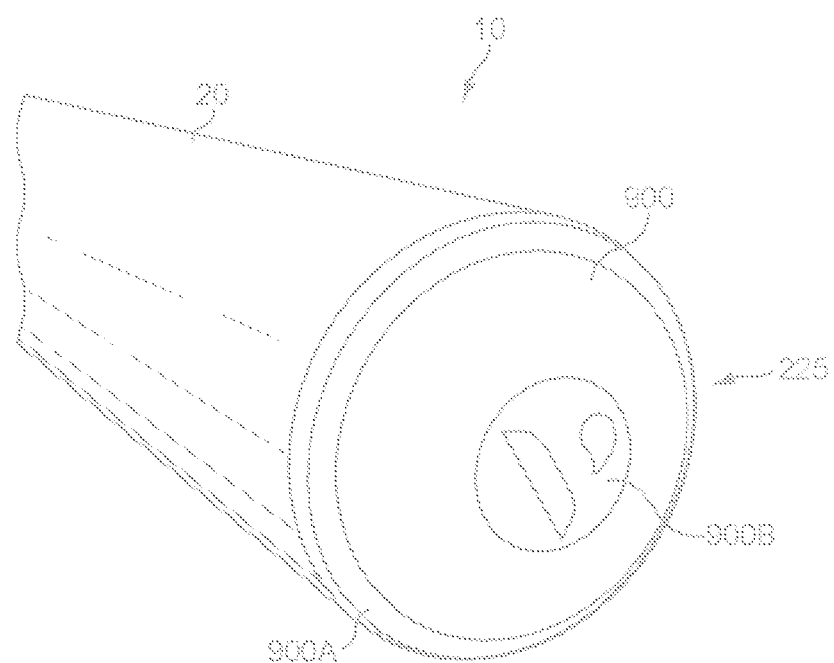
FIG. 5 illustrates a cap with a connector at another end of the body of the e-cigarette of FIG. 1 in accordance with some embodiments of the disclosure.

FIG. 5 shows the cap or tip 225 of the body 20 of the e-cigarette 10 in accordance with some embodiments of the disclosure. The cap 225 comprises a connector 900 comprising two electrical contacts 900A, 900B. The electrical contact 900B is a circular point-type contact located at the center of the cap 225. The electrical contact 900A is a circular ring which is concentric with the contact 900A and provided around the outside or rim of the cap 225. It will, however, be appreciated that any other shape configuration of the electrical contacts could be used. The electrical contacts 900A, 900B are typically made of metal and are connectable to positive and negative electrical terminals of a recharging e-cigarette pack so as to (re)charge the e-cigarette 10 (as explained in more detail later on).

Figure 6:
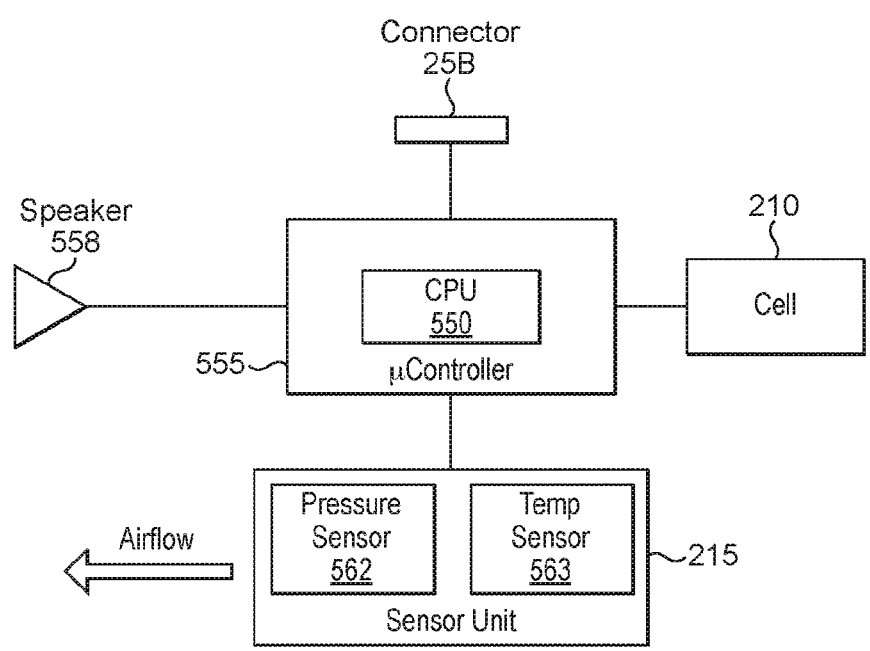
FIG. 6 is a schematic diagram of the main functional components of the body of the e-cigarette of FIG. 1 in accordance with some embodiments of the disclosure.

FIG. 6 is a schematic diagram of the main functional components of the body 20 of the e-cigarette 10 of FIG. 1 in accordance with some embodiments of the disclosure. These components may be mounted on the circuit board provided within the body 20, although depending on the particular configuration, in some embodiments, one or more of the components may instead be accommodated in the body 20 to operate in conjunction with the circuit board, but is/are not physically mounted on the circuit board itself.

The body 20 includes the sensor unit 215 located in or adjacent to the air path through the body 20 from the air inlet to the air outlet (to the vaporizer). The sensor unit 215 includes a pressure drop sensor 562 and temperature sensor 563 (also in or adjacent to this air path). The body 20 further includes a small speaker 558 and an electrical socket or connector 25B for connecting to the cartomizer 30 or to a USB charging device. (The body 20 may also be provided with a tip connector 900, such as discussed above in relation to FIG. 5.)

The microcontroller (e.g. an ASIC) 555 includes a CPU 550. The operations of the CPU 550 and other electronic components, such as the pressure sensor 562, are generally controlled at least in part by software programs running on the CPU (or other component). Such software programs may be stored in non-volatile memory, such as ROM, which can be integrated into the microcontroller 555 itself, or provided as a separate component. The CPU 550 may access the ROM to load and execute individual software programs as and when required. The microcontroller 555 also contains appropriate communications interfaces (and control software) for communicating as appropriate with other devices in the body 10, such as the pressure sensor 562.

The CPU 550 controls the speaker 558 to produce audio output to reflect conditions or states within the e-cigarette 10, such as a low battery warning. Different signals for signaling different states or conditions may be provided by utilizing tones or beeps of different pitch and/or duration, and/or by providing multiple such beeps or tones. The e-cigarette 10 may also be provided with an LED indicator (instead of or as well as speaker 558) to provide visual output to a user, such as a warning of low battery charge.

As noted above, the e-cigarette 10 provides an air path from the air inlet through the e-cigarette 10, past the pressure drop sensor 562 and the heater 365 (in the vaporizer or cartomizer 30), to the mouthpiece 35. Thus when a user inhales on the mouthpiece 35 of the e-cigarette 10, the CPU 550 detects such inhalation based on information from the pressure drop sensor 562. In response to this detection, the CPU 550 supplies power from the battery or cell 210 to the heater 365, which thereby heats and vaporizes the nicotine from the wick for inhalation by the user. The level of power supplied to the heater 365 may be controlled on the basis of information from the pressure sensor and/or the temperature sensor 563, for example, to help regulate the nicotine delivery to the user according to the current ambient air pressure and temperature.

Figure 7:
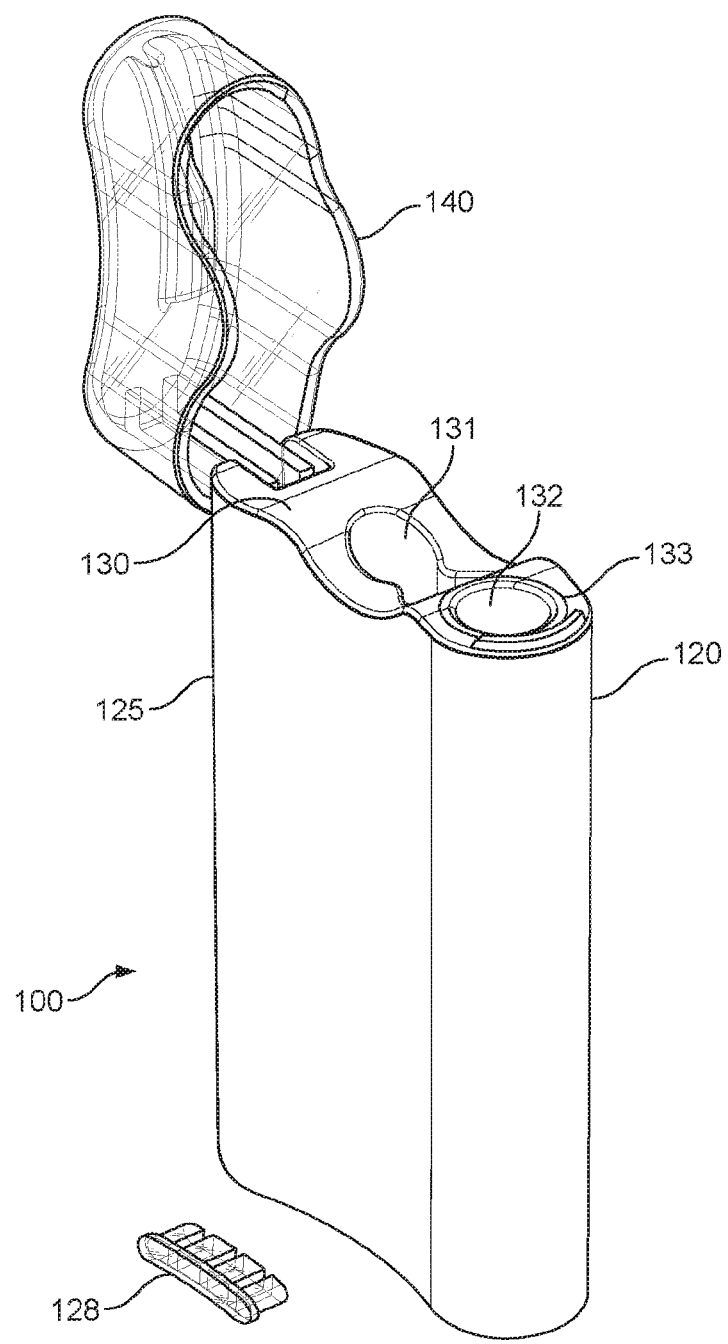
FIG. 7 illustrates a pack for receiving and accommodating an e-cigarette in accordance with some embodiments of the disclosure.

FIG. 7 illustrates a pack 100 for receiving and accommodating an e-cigarette 10 in accordance with some embodiments of the disclosure. The pack 100 comprises a body 120 which is provided with a hinged lid 140 that can open and close. The body 120 comprises an outer case or housing 125 which is fitted with an insert 130. More particularly, the outer case 125 has an opening at the top, i.e. the end at which the lid 140 is located, and the insert 130 is fitted into, and generally closes, this opening. The insert 130 itself is provided with two openings or holes that extend down into the body 120 of the pack 100. The first opening 132 comprises a substantially circular hole (in terms of cross-sectional shape). The first opening 132 is surrounded by an annular light element 133. The second opening 131 in the insert 130 comprises a pair of linked holes (only one of which is easily visible in FIG. 7). The openings 132 and 131 (and more particularly, each of the pair of holes formed by opening 131) can be used to receive an appropriately shaped object, such as an e-cigarette 10, a spare or used cartridge, etc. The dimensions of pack 100 are generally arranged so that an e-cigarette 10 accommodated within openings 132 or 131 protrudes slightly out of this opening. This allows a user to readily discern the contents of pack 100 (as also helped by making lid 140 transparent), and also facilitates removal by a user of an e-cigarette 10 located within one of these openings.

The pack 100 is further provided with a set of LED lights, which are mounted on a PCB 160 (as described below in relation to FIG. 8). These LED lights are protected by light cover 128, which is shown separated from the casing 125 in FIG. 7 in an exploded view, but which in the assembled pack is integrated into the body 120 so as to lie flush with the outer casing 125. These LED lights can be used to indicate the charging state of the pack 100, for example, whether it is fully charged, partly charged, or fully discharged. The LED lights may also be used to indicate whether or not the pack 100 is currently charging (being charged). Such charging may be accomplished via a (mini or micro) USB link using a (mini or micro) USB connector located on the underside of the pack 100 (not visible in FIG. 7).

Figure 8:
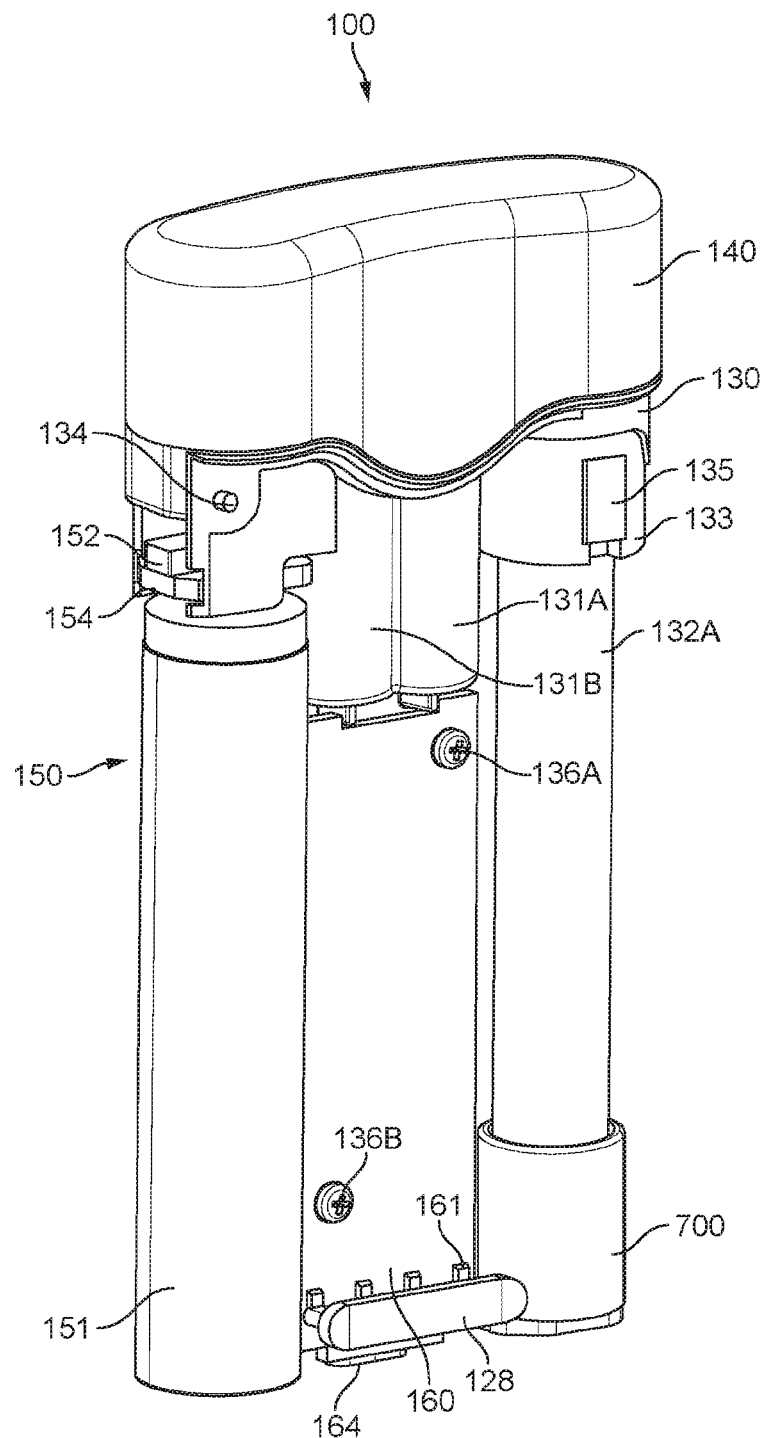
FIG. 8 illustrates the main components that are housed within the body of the pack of FIG. 7 in accordance with some embodiments of the disclosure.

FIG. 8 illustrates the main components that are housed within the body 120 of the pack 100, more particularly, within housing 125, in accordance with some embodiments of the disclosure (some minor components, such as internal wiring, are omitted for reasons of clarity). The body 120 includes a battery unit 150 comprising a battery 151, a printed circuit board (PCB) 154, and a switch 152. The body 120 can be seen to include a hinge or axle 134, which provides a pivot about which the lid 140 is able to open and shut. The battery unit 150, including the switch 152, is located substantially below the hinge 134. The switch 152 is activated as the lid 140 is opened or closed, and this activation of the switch then, in turn, is able to trigger activation of the LED lights, etc.

As illustrated in FIG. 8, the insert 130 extends substantially to the bottom of the outer casing 125. The insert 130 is fitted with a substantially cylindrical tube 132A extending down from opening 132 (see FIG. 7), which is able to receive and hold an e-cigarette 10. The insert 130 is molded to include two further substantially cylindrical tubes 131A, 131B, which overlap one another, extending down from opening 131 (see FIG. 7) with a "figure-of-8" cross-section. Note that the bottom of tubes 131A and 131B may be closed by the insert itself 130, or may be open, but abutting against the bottom of the outer casing 125, which would then have the effect of again closing the bottom of the tubes 131A and 131B in order to retain an e-cigarette 10 (or other item, such as a spare cartridge, therein). The configuration of the bottom of the tube 132A is explained in more detail later on.

Note that the battery 151 is relatively large—comparable in size, for example, with the opening 132 and associated tube 132A for receiving an e-cigarette 10. Consequently the battery 151 of the pack 100 will usually have significantly greater electrical storage capacity than a battery provided in an e-cigarette 10 which may be accommodated within the pack 100. This allows the battery in the e-cigarette 10 to be re-charged, typically several times, using the battery unit 150 of pack 100, without the need for any additional, external power supply (such as a mains connection). This can be very convenient for a user, who may be in a location or situation which does not provide a ready connection to the mains power supply.

In order to support this re-charging of an e-cigarette 10 stored within the pack 100, the bottom portion of the tube 132A is located within an e-cigarette connection assembly 700. The e-cigarette connection assembly 700 allows an electrical connection to be made between the pack 100 and the electrical contacts 900A, 900B on the cap 225 of the e-cigarette 10 when the e-cigarette 10 is inserted into the tube 132A, thus allowing the e-cigarette battery to be charged using the pack battery 151. This is explained in more detail below.

The insert 130 is provided with printed circuit boards (PCBs) 135 and 160. The PCB 160 provides the main control functionality of the pack and is attached to tubes 131A, 131B by screws 136A, 136B, thereby retaining the PCB 160 in the appropriate position relative to the tubes 131A, 131B. A mini-USB (or micro-USB) connector 164 is provided at the bottom of the PCB 160, and is accessible through a corresponding aperture in the underside of the housing 125 of the pack body 120. This USB connector 164 can be used to connect an external power supply to the pack 100 for re-charging the battery 151 (and also any e-cigarette located in tube 132A). The USB connector 164 may also be used, if so desired, for communications with the electronics of the pack 100 and/or e-cigarette 10, for example to update software on the PCB 160 and/or to download usage data from the e-cigarette 10, etc. The PCB 160 is further provided with the LED indicator lights discussed above, along with a set of mechanical connectors 161 for retaining the light cover 128. In particular, the PCB 160 controls the LED indicator lighting to provide an indication to a user about the current charging situation of the pack 100, plus any other suitable information.

The PCB 135 is located on the outside of re-charging tube 132A, relatively near the top, i.e. closer to the hole or opening 132 for receiving an e-cigarette 10 for re-charging. This PCB 135 incorporates at least one light emitting diode (LED), which is used to illuminate the annular light element 133. The PCB 135, LED and annular light element 133 are used to provide an indication to a user about the current charging situation of an e-cigarette 10 located within tube 132A of the pack 100, plus any other suitable information.

Figure 9A:
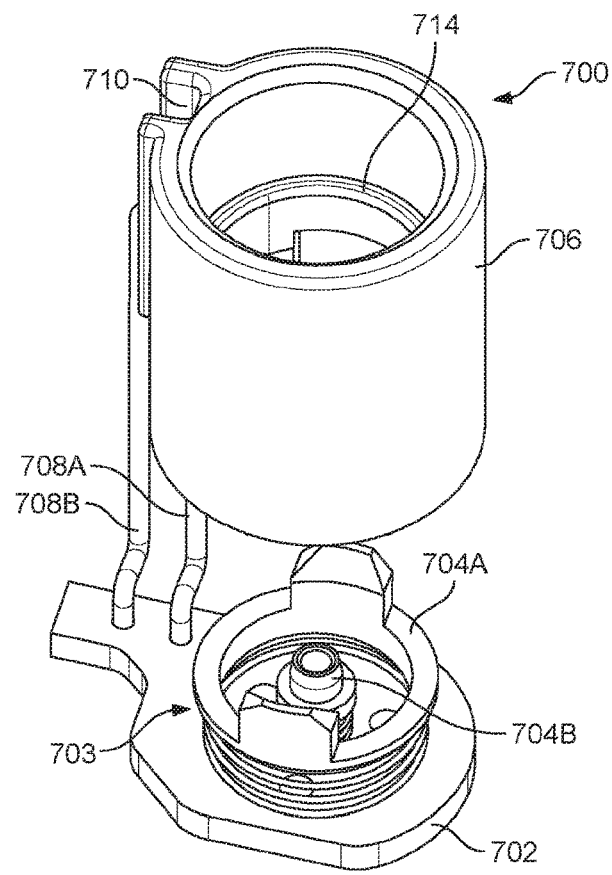
FIGS. 9A and 9B illustrate (in an exploded view) an e-cigarette connection assembly 700 of the pack of FIG. 7 in accordance with some embodiments of the disclosure.
Figure 9B:
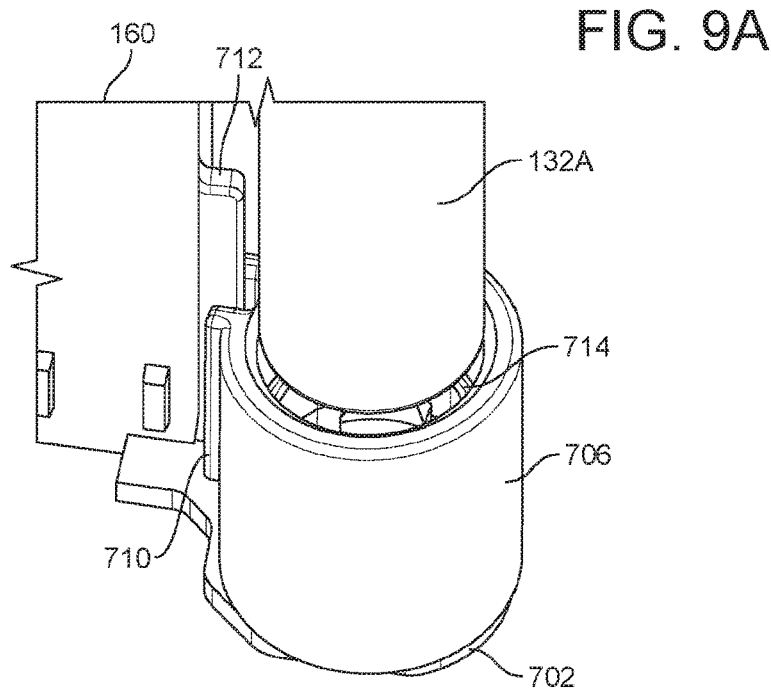

FIGS. 9A and 9B show (in an exploded view) the e-cigarette connection assembly 700 in more detail in accordance with some embodiments of the 10. The e-cigarette connection assembly 700 comprises a base 702, which is located on the base of the pack 100, and a connector 703, which has two electrical contacts 704A, 704B for making an electrical connection with the electrical contacts 900A, 900B on the cap 225 of the e-cigarette 10 when the e-cigarette 10 is inserted into the tube 132A. Specifically, the outer electrical contact 704A makes an electrical connection with electrical contact 900A on the e-cigarette 10 and the inner electrical contact 704B makes an electrical connection with the electrical contact 900B on the e-cigarette 10. The electrical contacts 704A, 704B are connected to the PCB 160 via wires 708A, 708B and, under the control of the PCB 160, act as positive and negative electrodes for charging the e-cigarette 10 with power supplied from the battery 151. The electrical contacts 704A, 704B are spring-mounted on the base 702 so as to ensure good electrical connection with the electrical contacts 900A, 900B on the cap 225 of the e-cigarette 10. Electrical conductors connecting the electrical contacts 704A, 704B and the wires 708A, 708B may extend along the surface of the base 702 or may extend through a bore through the base 702, for example.

The e-cigarette connection assembly 700 further comprises a cylindrical tube 706 which is fixed to the base 702. A portion of the cylindrical tube 706 is configured to receive an end portion of the tube 132A. The inner diameter of the portion of the cylindrical tube 706 which receives the end portion of the tube 132A is set such that the outer surface of the end portion of the tube 132A frictionally engages with the inner surface of the cylindrical tube 706. The inner surface of the cylindrical tube 706 further comprises a rib or step 714 which abuts the end of the tube 132A and ensures that only an end portion of the tube 132A having a predetermined length is able to enter the cylindrical tube 706. The cylindrical tube 706 further comprises a groove 710 on its outer surface which engages with a rib 712 on the insert 130.

When the insert 130 and e-cigarette connection assembly 700 are inserted into the outer case 125, the base 702 abuts the bottom inner surface of the outer case 125. The insert 130 and e-cigarette connection assembly 700 are held in place within the outer case 125 (and also in relation to one another).

It will be appreciated that the configuration and arrangement of the pack 100 and insert 130 shown in FIGS. 7, 8 and 9 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation. It is also noted that the shape and positioning of the electrical contacts 704A, 704B will be adapted according to different shape and positional configurations of electrical contacts 900A, 900B on the e-cigarette 10.

The connection assembly will now be described in more detail with reference to FIGS. 10 to 14.

The connection assembly 700 may be considered as having a housing which is provided by the plate-like base 702 and the tube 706. The tube functions as a body 706 of the housing that is mounted on the base 702 by pins 706A which project through respective apertures in the base 702 and which are shown in FIG. 10 as being ready to be heat fused (heat staked) and which are shown in FIG. 11 as having been heat fused to attach the tube 706 to the base 702.

Figure 10:
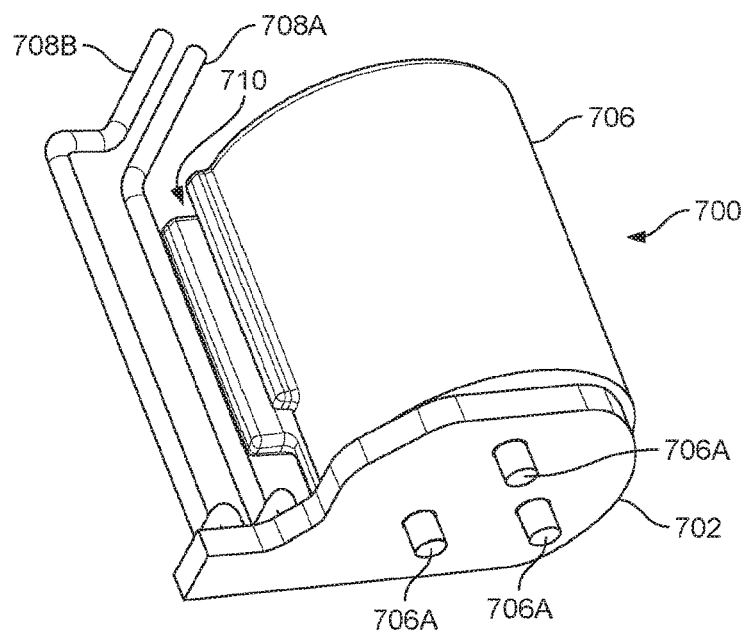
FIGS. 10 and 11 are perspective views of the assembled connection assembly 700 in accordance with some embodiments of the disclosure.
Figure 11:
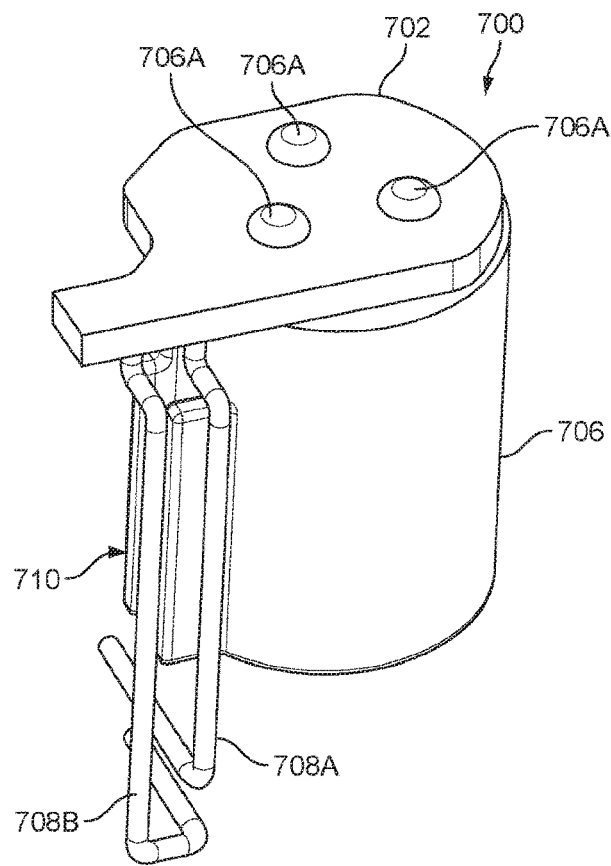

FIGS. 10 and 11 show the groove 710 extending longitudinally along the outer annular wall of the tube 706. The groove 710 engages with another component of the body 120, in this instance with a rib 712 (see FIG. 9B) on the insert 130, to help rotationally fix the connection assembly 700 relative to the longitudinal axis of the tube 132A to which the connection assembly is attached.

Figure 12:
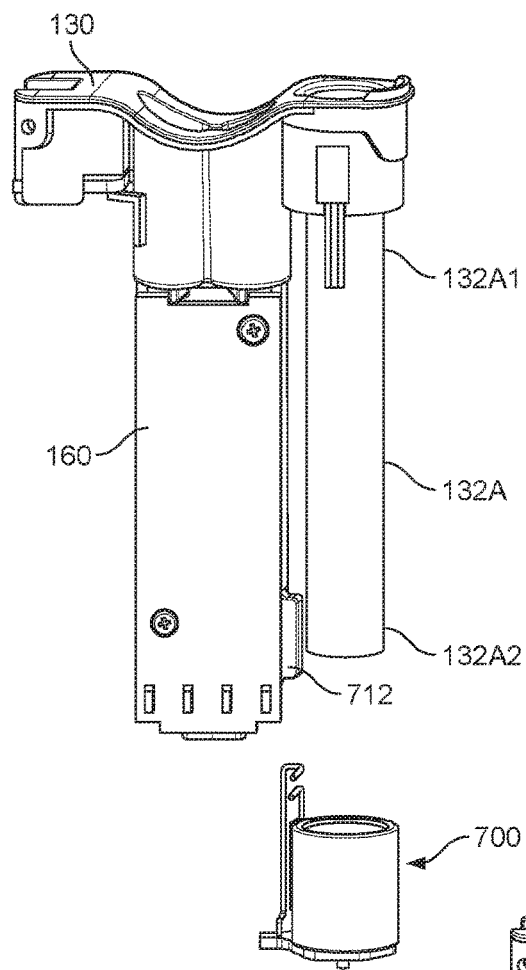
FIGS. 12 and 13 illustrate how the connection assembly 700 may be assembled onto the base of the tube used to re-charge an e-cigarette in accordance with some embodiments of the disclosure.
Figure 13:
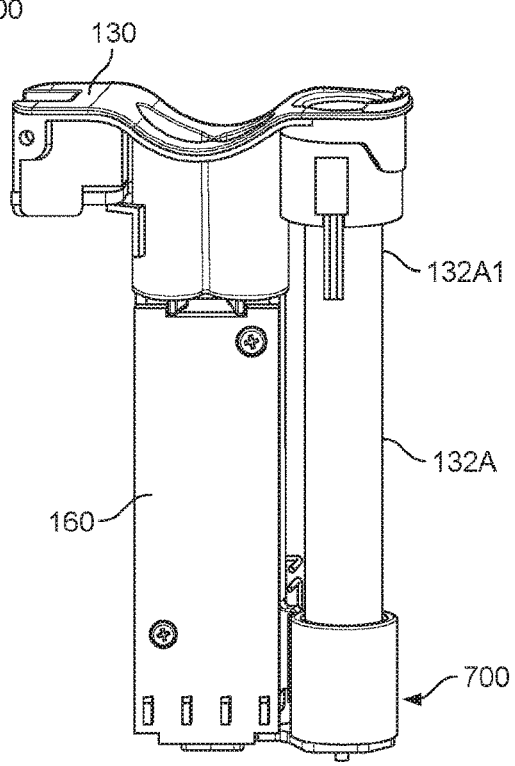

The attachment process is shown in FIGS. 12 and 13. The tube 132A has a first, upper end 132A1 and a second, lower end 132A2. The connection assembly 700 is pushed up onto the second end 132A2 of the tube 132A and the second end 132A2 is a press fit (friction fit) inside an upper or first compartment of the tube 706 of the connection assembly 700. During the attachment process, the connection assembly 700 is rotationally positioned so that the groove 710 slides onto the rib 712.

Figure 14:
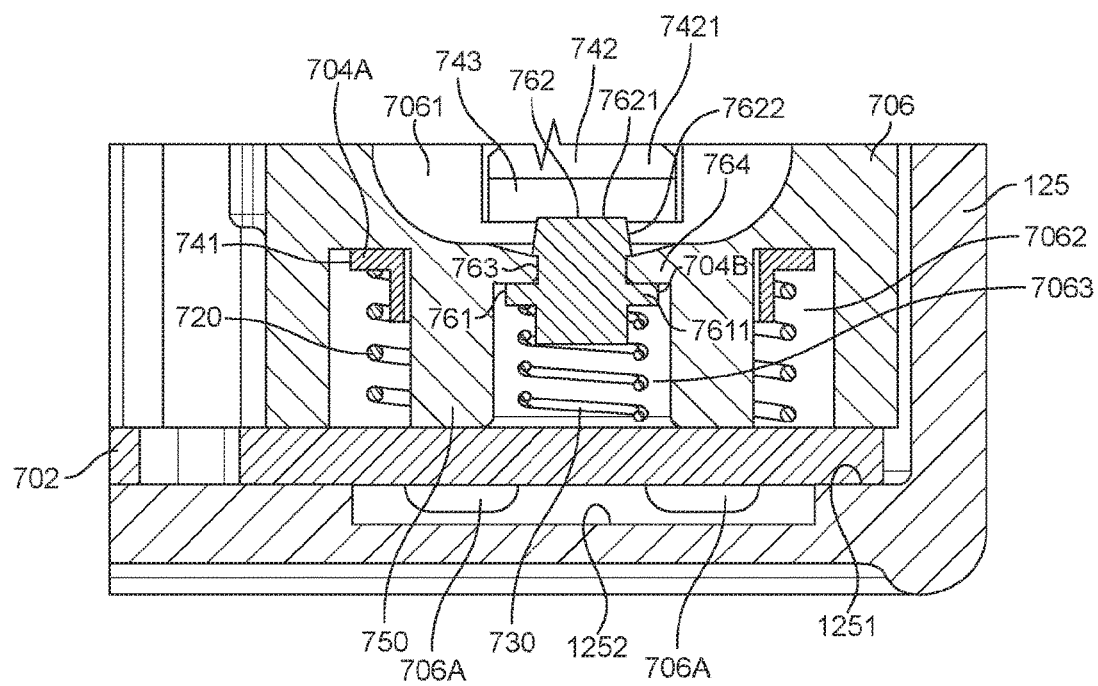
FIG. 14 is an enlarged vertical cross-sectional view through the bottom part of the connection assembly 700 when the connection assembly is positioned inside the outer case of the pack in accordance with some embodiments of the disclosure.

The base 702 is a PCB. Referring to FIG. 14, an outer coil spring 720 upwardly biases the outer or annular contact 704A of the connector 703 and electrically connects the outer contact 704A to the wire 708A. An inner coil spring 730 applies upward bias to the inner or central contact 704B of the connector 703 and electrically connects the inner contact 704B to the wire 708B.

The tube 706 is divided into first, second and third compartments 7061, 7062 and 7063. The top of the first compartment 7061 is visible in FIG. 9A, and the bottom of the first compartment is visible in FIG. 14. The first compartment 7061 is generally bowl-like in shape.

The second compartment 7062 is shown in FIG. 14 and is annular and contains an annular base 741 of the outer contact 704A. The annular base 741 carries two lugs 742 which project upwards from the base 741 in the direction of the first end 132A1 of the tube 132A. The lugs 742 are circumferentially spaced apart around the annular base 741 by approximately 180 degrees. Additional lugs may be provided (e.g. a total of four lugs) and may be uniformly spaced apart in the circumferential direction of the annular base 741 with a separation angle of 360/N where N is the number of lugs.

Each lug 742 extends through a guide passage from the second compartment 7062 up into the first compartment 7061 so that the upper or free end 7421 of the lug 742 is exposed in the first compartment 7061 for interacting with the tip 225 of the e-cigarette 10. The guide passage (not shown) is provided inside the body of material of the tube 706. When a downward force is applied to the lugs 742, they move downwards in the guide passages against the biasing force of the outer spring 720 in the second compartment 7062.

An annular wall 750 in the bottom part of the body 706 separates the annular second compartment 7062 from the central third compartment 7063, which contains the inner spring 730. The central contact 704B has a base 761 located in the third compartment 7063 and an upwardly projecting lug 762 which projects up out of the third compartment 7063 through a central passage 763 in a transverse wall 764 which divides the third compartment 7063 from the first compartment 7061. The lug 762 has an upper or free end 7621 which is exposed in the first compartment for interacting with the central contact 900B of the connector 900 of the tip 225 of the e-cigarette 10.

The inner spring 730 applies an upward biasing force to the base 761 of the central contact 704B by pressing against an annular flange 7611 of the base 761. The central passage 763 may be shaped to grip and restrain the central contact 704B by, for example, forming a snap fit between the flange 7611 and an annular lip 7622 of the lug 762. Alternatively, the passage 763 may be shaped to permit some downward displacement of the central contact 704B against the force of the inner spring 730, for example when the central contact 900B of the e-cigarette 10 presses down against the central contact 704B towards the end of the process of inserting the e-cigarette 10 into the tube 132A.

Thus, it may be seen that the first compartment 7061 is provided at a first or upper end of the body 706, and the second and third compartments 7062, 7063 are provided at a second or lower end of the body 706. The second and third compartments 7062, 7063 are closed by the base (PCB) 702 as shown in FIG. 14.

In the assembled pack 100, the base 702 sits on an inner bottom wall surface 1251 of the outer case 125. The pins 706A are accommodated in a recess 1252 in the wall surface 1251. Thus, it may be considered that the connection assembly 700 is held or sandwiched in position between the tube 132A and the outer case 125 (see FIGS. 15 and 16).

By looking at FIG. 9A and FIG. 14, it may be seen that the free ends 7421 of the lugs 742 have inner side walls which are inclined relative to the longitudinal axis of the tube 132A and which produce a taper (reduction in diameter) between the inner side walls of the lugs in the downward or insertion direction of the e-cigarette 10. This helps the inner side walls to guide and then frictionally grip the tip 225 of the e-cigarette 10.

The weight of the e-cigarette 10 may be considered to lie within a range of weights (e.g. allowing for consumption of the nicotine liquid and for manufacturing variances). The force of the outer spring 720 is selected to balance the weight of the e-cigarette 10 when it is in the range of weights, such that as the e-cigarette 10 descends down the tube 132A it comes into contact with the lugs 742 of the outer contact 704A, compresses the outer spring 720 and descends further into contact with the lug 762 of the inner contact 704B, where the e-cigarette 10 comes to a halt.

When insertion of the e-cigarette 10 compresses the inner spring 730 as well as the outer spring 720, the combined force of the springs 720, 730 may be selected to balance the weight of the e-cigarette 10, such that the weight of the e-cigarette 10 is slightly greater than the combined spring forces. Thus, the e-cigarette compresses the springs 720, 730 as it comes into contact with the outer and inner contacts 704A, 704B and the e-cigarette 10 comes to a halt when its tip 225 rests against the bottom of the first compartment 7061.

The volume between the lugs 742 may be considered to be a docking volume or station 743 which receives the tip 225 of the e-cigarette 10.

Figure 15:
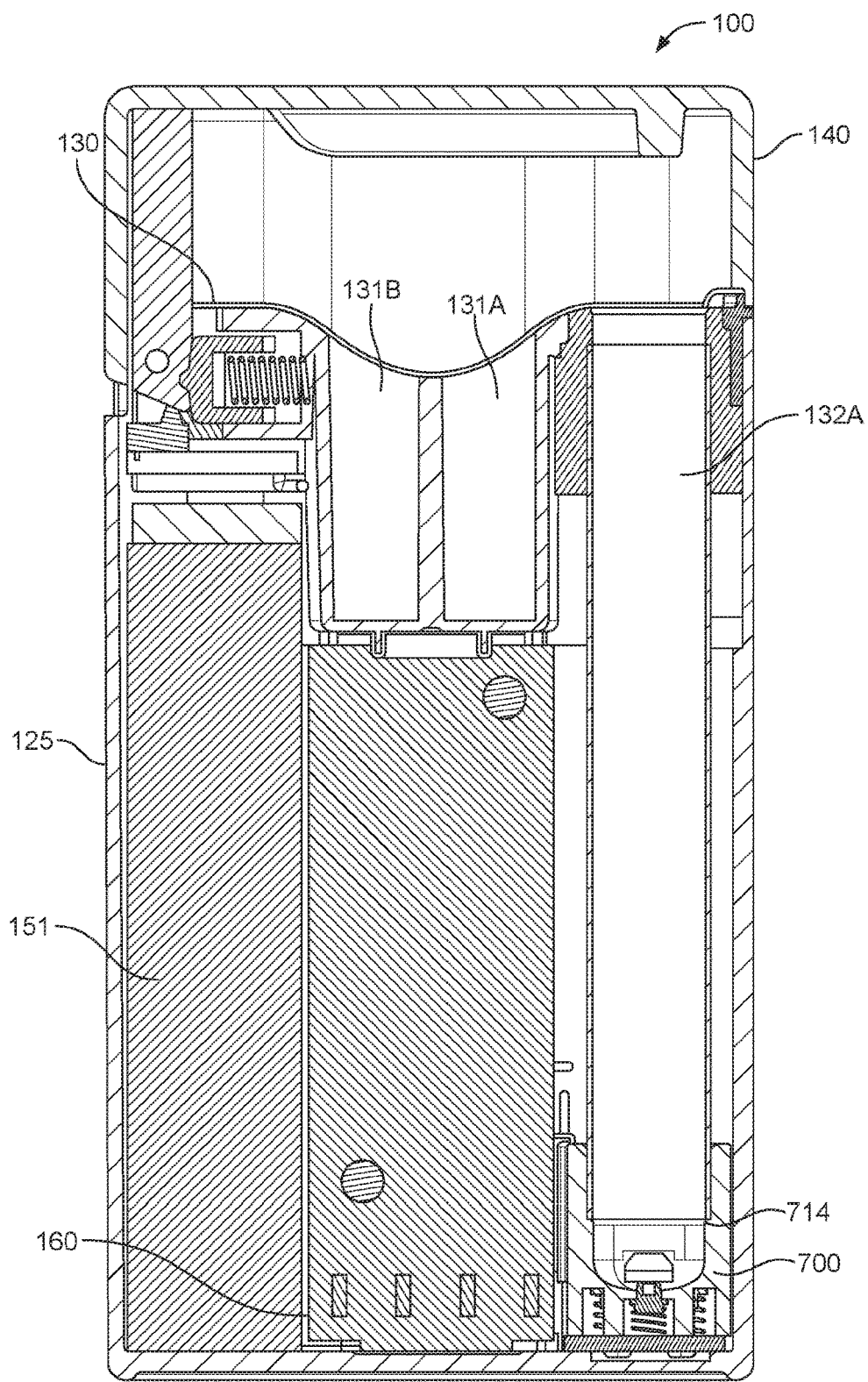
FIG. 15 is a vertical cross-sectional view through the pack (without cartomizers and an e-cigarette being stored in the pack in accordance with some embodiments of the disclosure).

Referring to FIG. 15, it may be seen that the inner surface of the first compartment 7061 provides a circumferential rib or step 714 which limits the depth of insertion of the tube 132A into the first compartment 7061 and thus into the body 706. The diameter of the lower part of the first compartment 7061 matches the inner diameter of the tube 132A.

FIG. 15 shows the pack 100 with nothing inserted in the tubes 131A, 131B and 132A.

Figure 16:
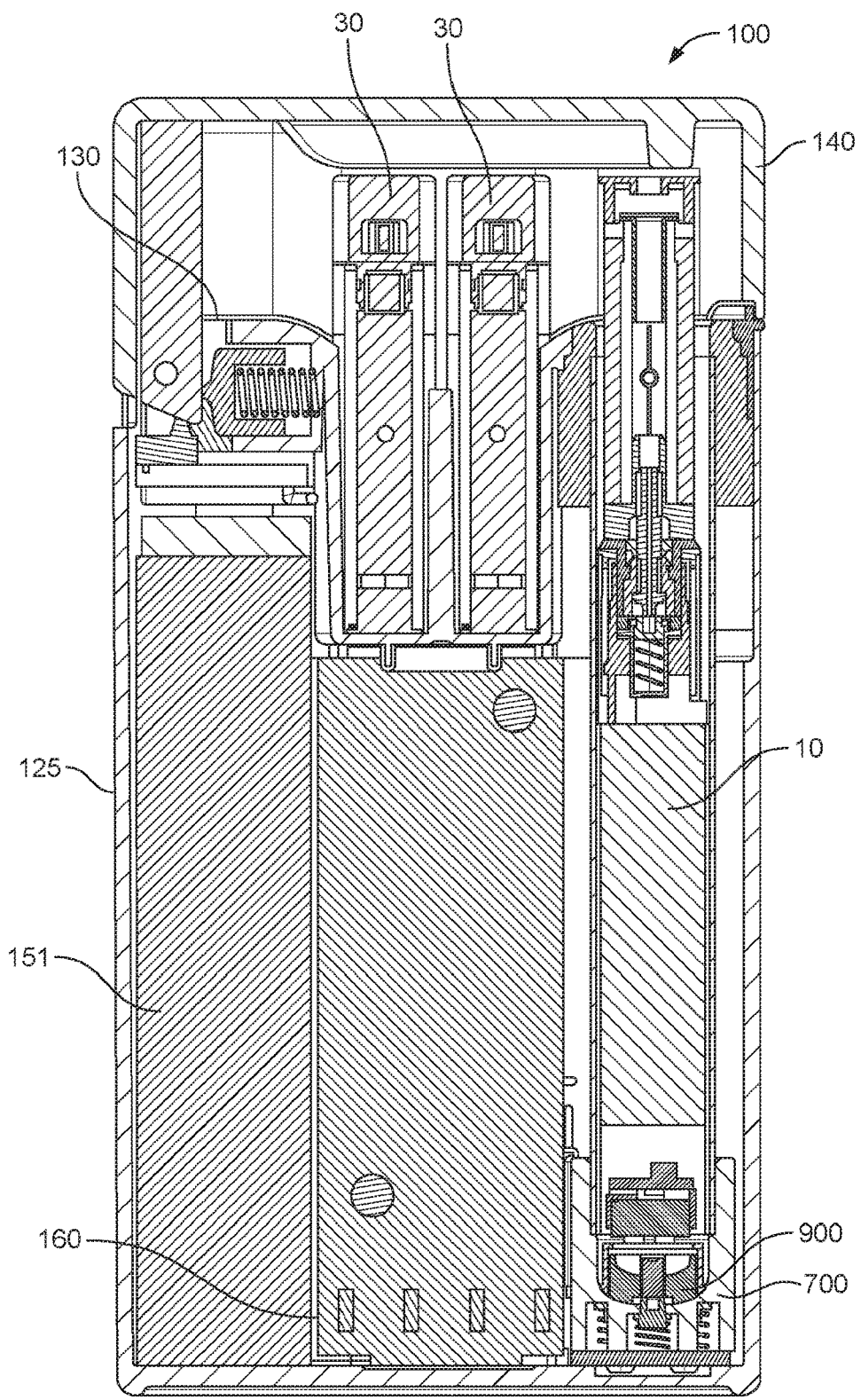
FIG. 16 is a vertical cross-sectional view through the pack (when two cartomizers and an e-cigarette are being stored in the pack) in accordance with some embodiments of the disclosure.

FIG. 16 show the pack 100 with two cartomizers 30 in the tubes 131A, 131B and an e-cigarette 10 docked in the tube 132A.

Figure 17:
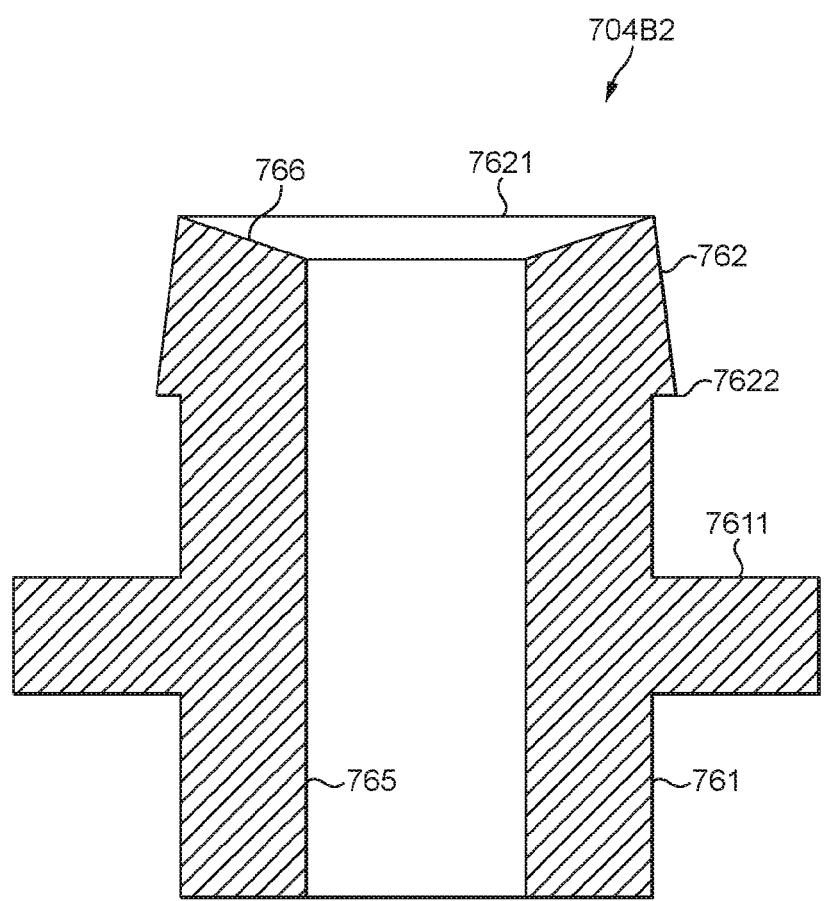
FIG. 17 is a vertical cross-sectional view through an alternative central contact of the connection assembly 700 in accordance with some embodiments of the disclosure.
Figure 18:
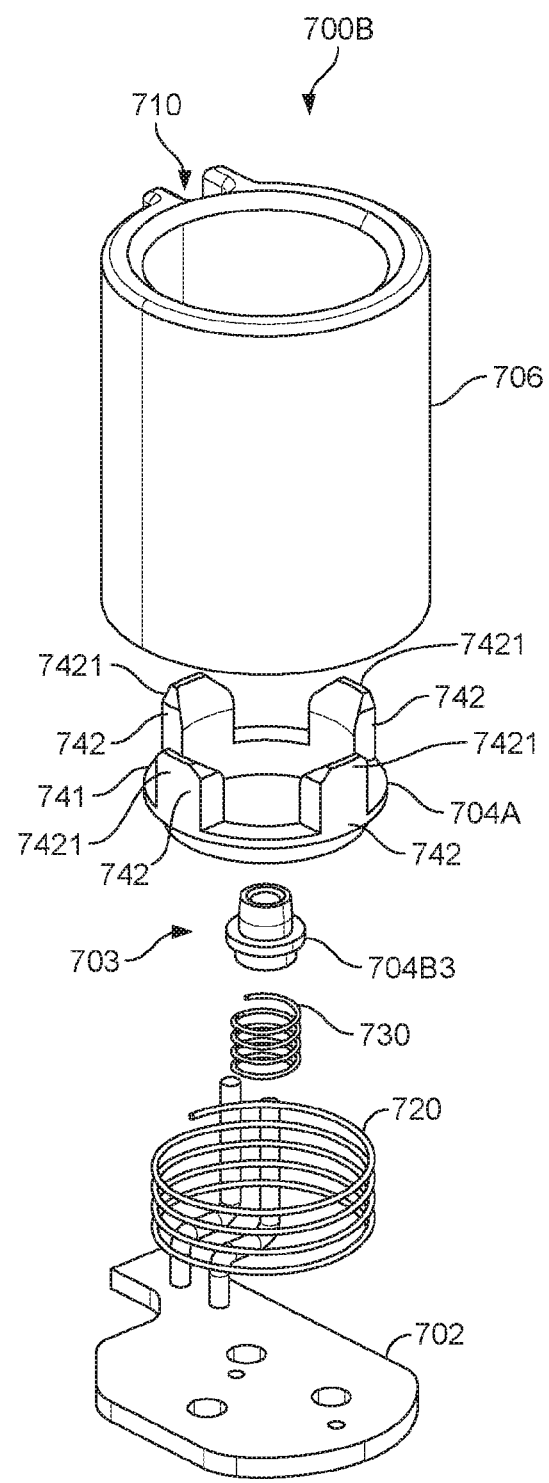
FIGS. 18 and 19 are respectively exploded and partially exploded views of an alternative connection assembly 700B in accordance with some embodiments of the disclosure.
Figure 19:
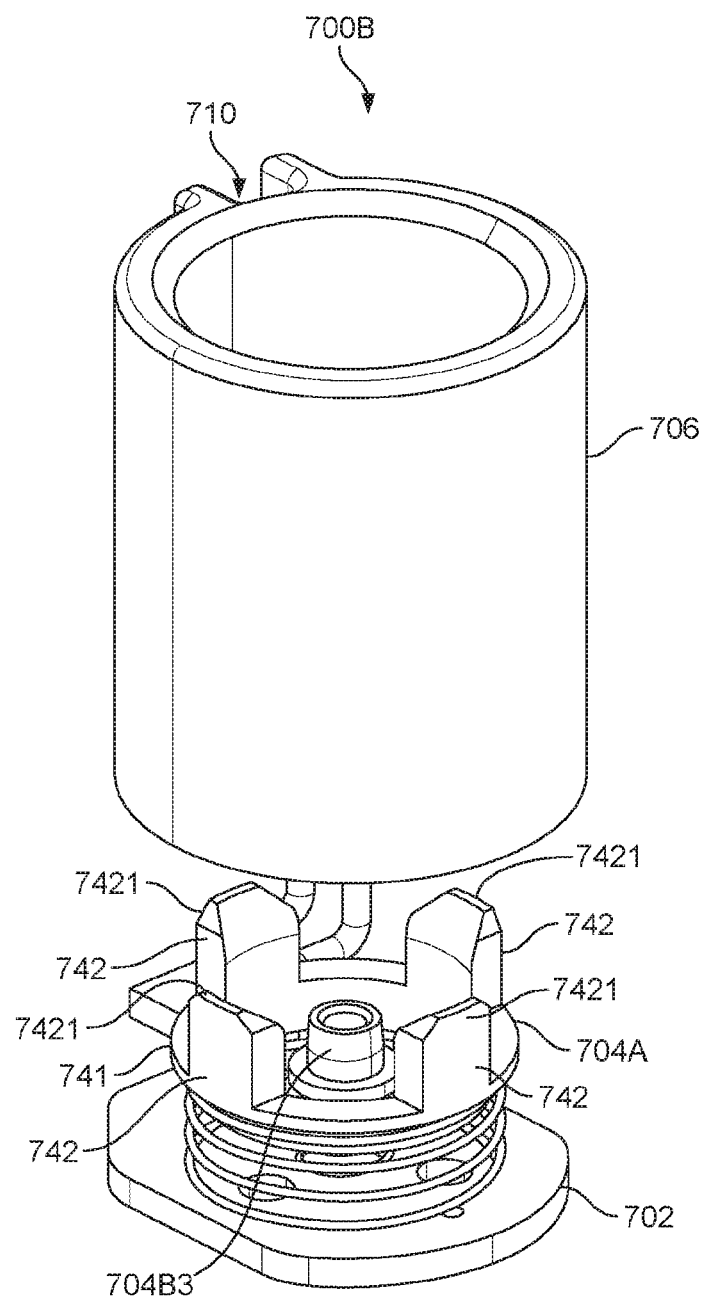
Figure 20:
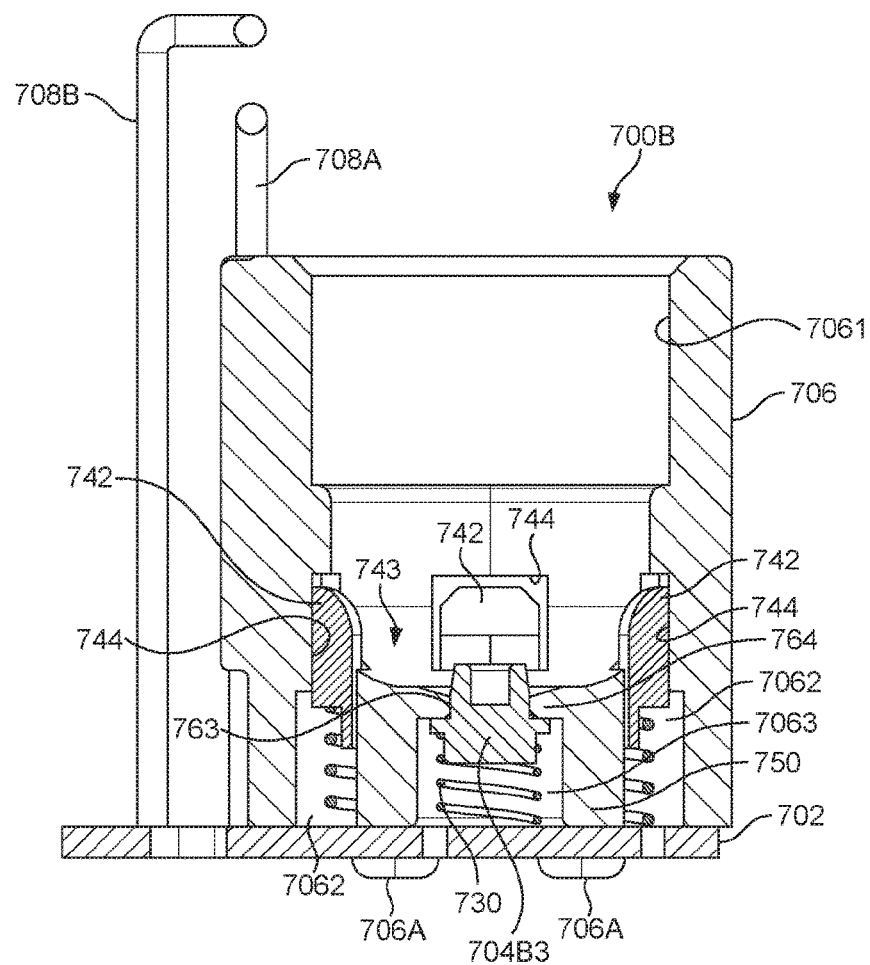
FIG. 20 is a vertical cross-sectional view of the connection assembly 700B of FIGS. 18 and 19 in accordance with some embodiments of the disclosure.
Figures 21, 22:
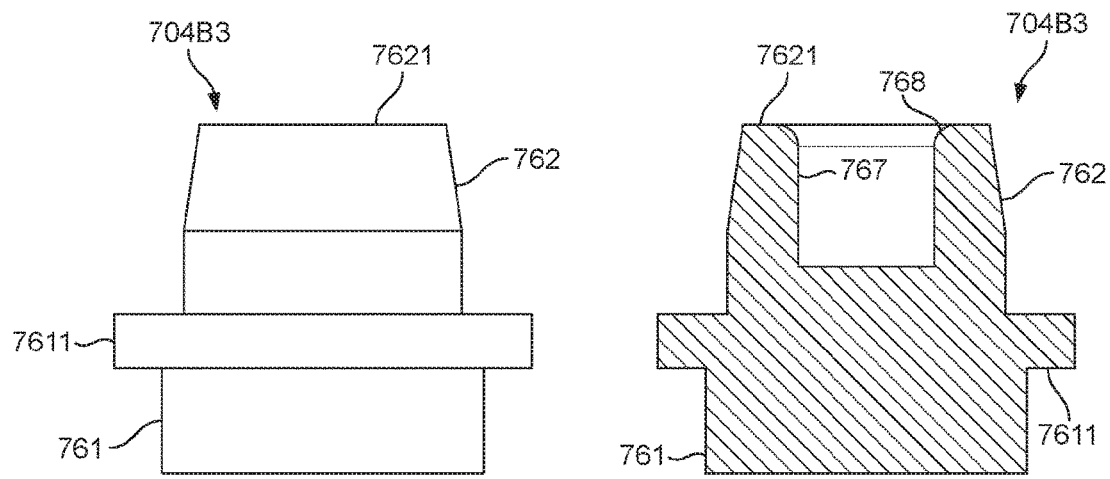
FIGS. 21 and 22 are respectively a side view and a vertical cross-sectional view of the central contact of the connection assembly 700B of FIGS. 18 and 19 in accordance with some embodiments of the disclosure.
Figure 23:
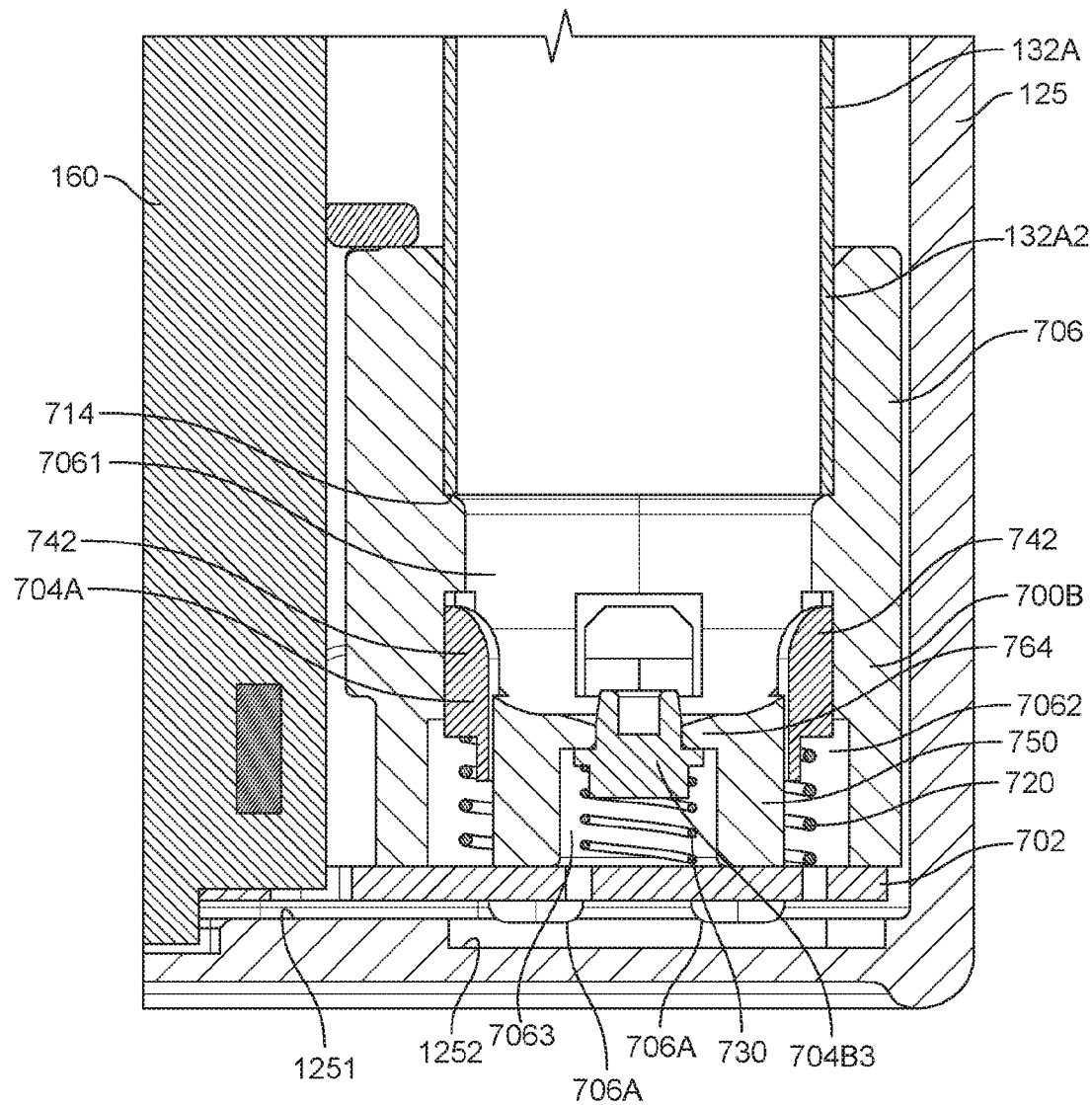
FIG. 23 is a vertical cross-sectional view of the connection assembly 700B of FIGS. 18 and 19 when the connection assembly is positioned inside the outer case of the pack (and showing just the bottom right corner of the pack) in accordance with some embodiments of the disclosure.
Figure 24:
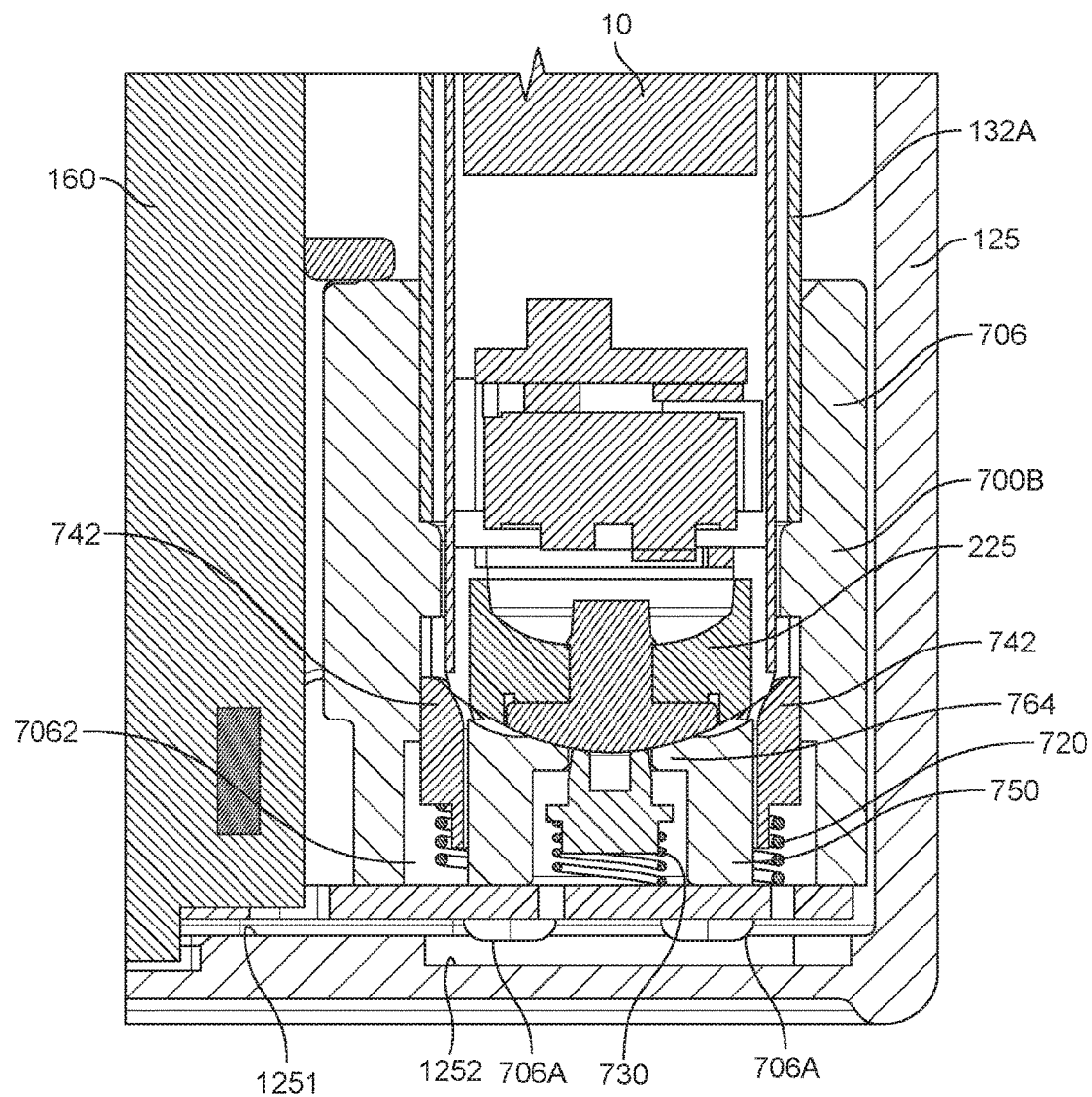
FIG. 24 is a vertical cross-sectional view of the connection assembly 700B of FIGS. 18 and 19 when the connection assembly is positioned inside the outer case of the pack (and showing just the bottom right corner of the pack) when an e-cigarette is being stored in the pack in accordance with some embodiments of the disclosure.
Figure 25:
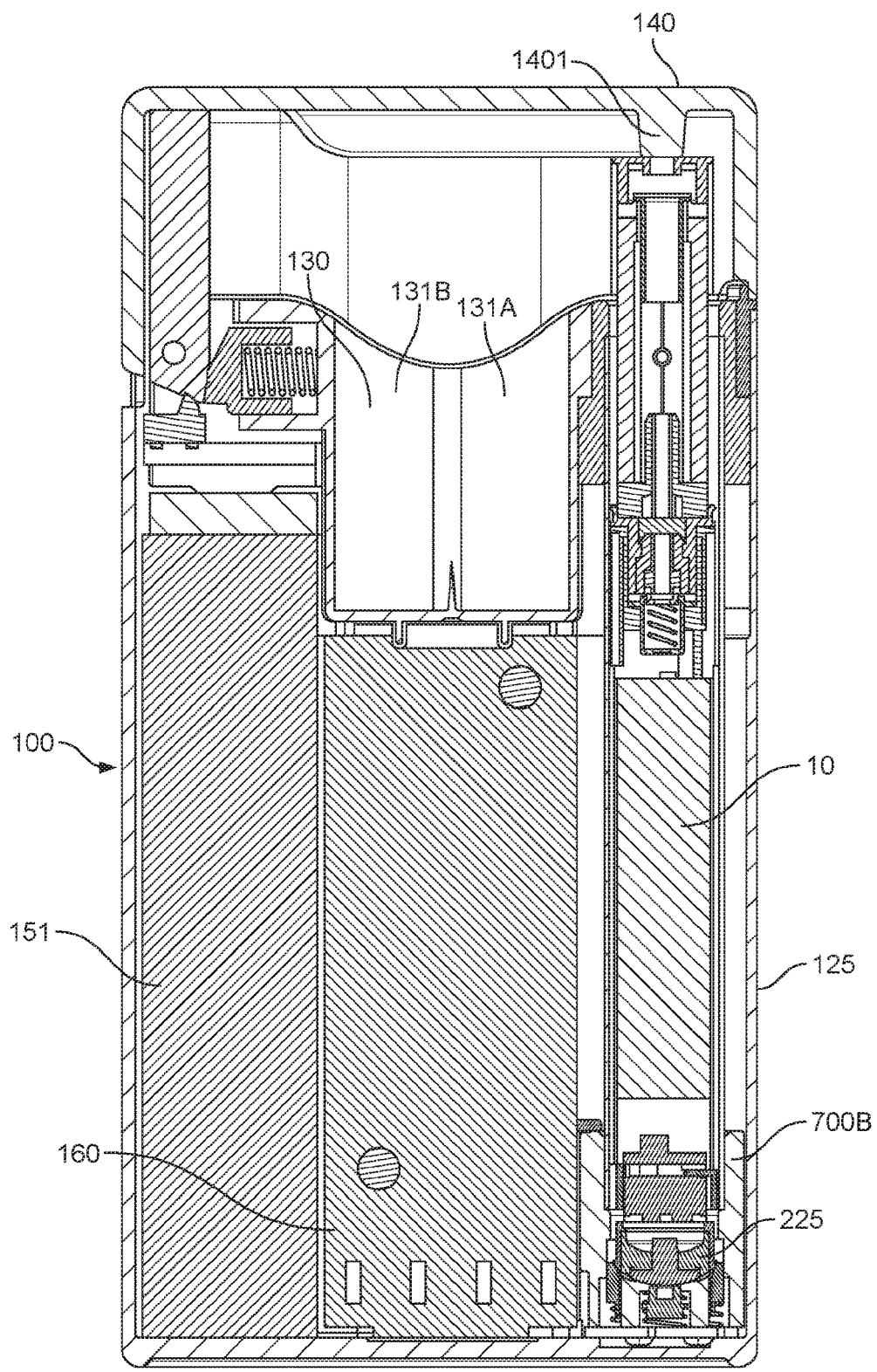
FIG. 25 is a vertical cross-sectional view of the connection assembly 700B of FIGS. 18 and 19 when the connection assembly is positioned inside the outer case of the pack (and showing all of the pack) when an e-cigarette is being stored in the pack in accordance with some embodiments of the disclosure.

FIG. 17 shows an alternative inner or central contact 704B2 to the inner or central contact 704B shown in the preceding Figures (e.g. in FIG. 14). The differences between the central contact of FIG. 17 and the central contact of FIG. 14 will now be described. As may be seen in FIG. 17, the central contact 704B2 has a central through bore 765 such that the central contact 704B2 is generally tubular in the direction of its longitudinal axis (the vertical direction in FIG. 17). The upper or free end 7621 of the lug 762 is concavely curved and thus, because of the existence of the central bore 765, provides an annular docking surface for receiving (and conforming to the shape of) the convexly curved tip 225 of the e-cigarette 10 and, specifically, the convexly curved central contact 900B of the connector of the connector 900 of the tip 225 of the e-cigarette 10. The concave curvature of the upper end 7621 of the lug 762 helps to ensure better electrical docking of the e-cigarette 10 in the pack 100 for re-charging the e-cigarette 10.

An alternative connection assembly 700B in accordance with some embodiments of the disclosure will now be described with reference to FIGS. 18 to 25. Where the components of the connection assembly 700B are the same as for the connection assembly 700 that has already been described, the same reference numerals are used and, for reasons of brevity, the description of those components will not be repeated again.

A main difference between the connection assembly 700B and the connection assembly 700 is that, in the connection assembly 700B, the outer contact 704A is provided with four lugs 742 which are equi-angularly spaced apart around the annular base 741 at intervals of 90 degrees. The four lugs 742 are most clearly visible in FIGS. 18 and 19.

Each lug 742 extends up through a respective guide passage 744 (see FIG. 20) from the second compartment 7062 up into the first compartment 7061 so that the upper or free end 7421 of the lug 742 is exposed in the first compartment 7061 for interacting with the tip 225 of the e-cigarette 10.

In the connection assembly 700B, the inner or central contact 704B3 has a different shape to the central contacts 704B, 704B2 that have already been described. As may be seen in FIGS. 21 and 22, the central contact 704B3 does not have the annular lip 7622 of the central contacts 704B, 704B2. The upper or free end 7621 of the central contact 704B3 has a central blind bore 767 having a circumferential upper edge 768 which is rounded or curved as viewed in the cross-sectional view of FIG. 22. The annular surface of the free end 7621 is flat and, when the central contact 900B of the connector 900 of the e-cigarette 10 is seated on the central contact 704B3, there is a circular line of contact between the central contact 900B and the circumferential upper edge 768 (see FIG. 24). This contrasts with the central contact 704B (without a central bore) which provides only a single point of contact.

The central contact 704B3 (FIGS. 21 and 22) is a small component and it is easier to manufacture than the central contact 704B2 (FIG. 17) with its concave surface 766. The blind bore 767 of the central contact 704B3 may be drilled into the flat surface of the upper end 7621 during the manufacturing process.

When the e-cigarette 10 is inserted into the tube 132A (see the transition from FIG. 23 to FIG. 24), the weight of the e-cigarette 10 (the average weight within a range of weights which takes into account factors such as manufacturing variations) is slightly greater than the combined spring forces of the outer and inner springs 720, 730. For example, the average weight may be 2 to 20% (more preferably, 2 to 10%, or 2 to 5%) greater than the combined spring forces. Thus the descent of the e-cigarette 10 is gently cushioned as its tip 225 docks in the connection assembly 700B. The outer and inner springs 720, 730 are compressed until the tip 225 comes to rest against the bottom of the first compartment 7061 of the tube 706, i.e. against the transverse wall 764. In this position, the connector 900 of the e-cigarette 10 is in direct electrical contact with the connector 703 of the connection assembly 700B.

The length of the e-cigarette 10 may vary within a range of lengths (e.g. to take into account factors such as manufacturing variations). The upper end of the range of lengths is chosen so that, when the lid 140 of the pack 100 is closed (see FIG. 25), and when a rib 1401 on the inside of the lid 140 is pressing against the top or mouthpiece end of the e-cigarette 10, the tip 225 of the e-cigarette 10 is resting on the transverse wall 764. For such an e-cigarette 10, when the pack 100 is turned upside down, the e-cigarette 10 will not move in the tube 132A.

If the actual length of an e-cigarette 10 is at the lower end of the range of lengths, when the pack 100 is turned upside down, the e-cigarette 10 will slide in the tube 132A until the mouthpiece of the e-cigarette 10 is resting against the rib 1401 of the lid 140. During this movement, the outer and inner springs 720, 730 will expand slightly whilst maintaining the electrical connection between the connector 900 of the e-cigarette 10 and the connector 703 of the connection assembly 700B.

As described herein, a pack is provided for holding and re-charging an e-cigarette which has a tip connector with first and second charging contacts, the pack comprising: a pack battery; a body including a tube having an open first end for receiving an e-cigarette; and a connection assembly which is positioned at a second opposite end of the tube and includes a connector with a central contact and an outer contact for re-charging the e-cigarette using the pack battery; wherein the outer contact of the connection assembly comprises a generally annular base and at least two lugs which project from the base in the direction of the first end of the tube and which define a docking station between the lugs for receiving the tip connector of the e-cigarette; and the base of the outer contact is spring-mounted relative to a housing of the connection assembly.

In some embodiments, the spring mounting of the outer contact enables the weight of the e-cigarette to be balanced against the spring force. The lugs help to establish a reliable and secure frictional gripping of the tip of the e-cigarette when it is docked for re-charging. Thus a reliable direct charge connection (a wired connection) may be established to the e-cigarette for the purposes of re-charging. The e-cigarette is gripped at its tip end and thus it is not necessary to arrange for gripping elsewhere along the length of the e-cigarette, such as at or adjacent the mouthpiece end.

The user may "feel" the interaction between the e-cigarette and the pack as the e-cigarette is inserted into the pack, and may judge when the gripping of the tip has occurred ready for the e-cigarette to be re-charged. The biasing force of the spring mounting of the outer contact of the connection assembly helps to provide this "feel". The user may also feel the frictional gripping of the tip of the e-cigarette between the lugs of the outer contact.

Conveniently, the connection assembly is in the form of a module which fits onto the second end of the tube. Thus, the connection assembly may be separately manufactured, and then fitted onto the tube. This helps with the assembly together of small components to form the connection assembly. The assembly together of the small components may be performed and checked. Then, the module (connection assembly) is in good condition for assembly onto the second end of the tube in a simple operation, such as a press fitting of the module onto the second end of the tube.

In some embodiments, the lugs comprise first to fourth lugs which are substantially equi-angularly spaced around the generally annular base of the outer contact. Alternatively, three (or six) lugs spaced apart by approximately 120 degrees (or 60 degrees) might work well for stably receiving and gripping the tip of the e-cigarette.

In some embodiments, the housing of the connection assembly comprises a body which has a first end with a first compartment for receiving the tip connector of the e-cigarette, and a second end with a second compartment containing the base of the outer contact; and each lug is slidably received in a (respective) guide passage which extends from the second compartment to the first compartment such that a free end of the lug is exposed in the first compartment.

In some embodiments, the second end of the tube fits into and is held by the first compartment. A side wall of the first compartment may include a step which limits the depth of insertion of the second end of the tube into the first compartment.

In some embodiments, the second compartment is generally annular and is separated from a central third compartment by a wall which guides movement of the base of the outer contact; and the third compartment contains a base of the central contact.

In some embodiments, a central lug of the central contact projects through a passage in a transverse wall of the housing of the connection assembly separating the third compartment from the first compartment.

In some embodiments, the housing of the connection assembly includes a base which closes the second compartment and which retains in position a spring of the outer contact.

In some embodiments, a base of the central contact is spring-mounted relative to the housing of the connection assembly.

In some embodiments, the base of the housing of the connection assembly closes the third compartment and retains in position a spring of the central contact.

In some embodiments, the base of the housing of the connection assembly sits on an inner bottom wall surface of an outer case of the body of the pack.

In some embodiments, inner side walls of the lugs are shaped such that the diameter of a gap between the inner side walls of the lugs tapers in the direction from the first end to the second end of the tube.

In some embodiments, the central contact of the connection assembly has a free end which faces towards the first end of the tube and which includes a central bore having a circumferential edge for seating the tip connector of the e-cigarette.

In some embodiments, the free end is generally flat and the circumferential edge of the central bore is rounded in cross-section.

As described herein, there is provided a system comprising: the pack as generally described above; an e-cigarette having a battery and a tip connector with a central contact and a generally annular outer contact for charging the battery of the e-cigarette; wherein the e-cigarette has a weight within a predetermined range of weights; and the spring-mounting of the outer contact of the connection assembly is arranged to deform resiliently under said weight of the e-cigarette when the tip connector of the e-cigarette is received substantially vertically downwards into the connection assembly, thereby establishing docking of the e-cigarette in the tube of the pack with the central contact of the e-cigarette being in electrical contact with the central contact of the connection assembly and with the outer contact of the e-cigarette being in electrical contact with the outer contact of the connection assembly.

In some embodiments, the spring-mounting of the central contact of the connection assembly is arranged to deform resiliently under said weight of the e-cigarette when the tip connector of the e-cigarette is received substantially vertically downwards into the connection assembly.

In some embodiments, the e-cigarette has a length within a predetermined range of lengths; a lid is pivotably mounted on the body of the pack; and when the e-cigarette is received in the tube of the pack and when the lid is closed, the lid presses on the end of the e-cigarette remote from the tip connector and maintains the resilient deformation of the spring-mounting of the outer contact and the central contact of the connection assembly.

As described herein, there is provided a method of re-charging an e-cigarette using a pack, wherein the e-cigarette comprises a battery, a mouthpiece and a tip connector with a central contact and a generally annular outer contact, and the pack comprises a pack battery and a tube having a first open end and a second end which is closed by a connection assembly which has a central contact and an outer contact which comprises a generally annular base and at least two lugs which project towards the first end of the tube, the method comprising: inserting the e-cigarette into the first end of the tube to move the tip connector down towards the connection assembly to position the tip connector between the lugs of the outer contact of the connection assembly; establishing electrical contact between the outer contact of the of the e-cigarette and the lugs of the outer contact of the connection assembly and between the central contact of the e-cigarette and the central contact of the connection assembly; allowing a spring supporting the outer contact of the connection assembly to resiliently deform under the weight of the e-cigarette; and using the pack battery to charge the battery of the e-cigarette.

Thus, the entire e-cigarette may be re-charged, and not just a body of an e-cigarette, thereby removing the need to disassemble an e-cigarette to enable re-charging to occur. The process may simply involve "dropping" an e-cigarette having a weight in a predetermined weight range into the tube.

In some embodiments, the method further comprises: allowing a spring supporting the central contact of the connection assembly to resiliently deform under the weight of the e-cigarette; and closing a lid of the pack so that the lid presses on the mouthpiece of the e-cigarette and maintains the resilient deformation of the springs supporting the outer and central contacts of the connection assembly.

In conclusion, this disclosure shows by way of illustration various embodiments in which that which is claimed may be practiced. The advantages and features of the disclosure are of a representative sample of embodiments only, and are not exhaustive and/or exclusive. They are presented only to assist in understanding and to teach that which is claimed. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include one or more other inventions not presently claimed, but which may be claimed in future.

The invention claimed is:

1. A pack for holding and re-charging an e-cigarette which has a tip connector with first and second charging contacts, the pack comprising:
  a pack battery;
  a body including a tube having an open first end for receiving an e-cigarette; and
  a connection assembly which is positioned at a second opposite end of the tube and includes a connector with a central contact and an outer contact for re-charging the e-cigarette using the pack battery;
  wherein the outer contact of the connection assembly comprises a generally annular base and at least two lugs which project from the generally annular base in the direction of the first end of the tube and which define a docking station between the lugs for receiving the tip connector of the e-cigarette;
  wherein the generally annular base of the outer contact is spring-mounted relative to a housing of the connection assembly; and
  wherein the central contact of the connection assembly has a free end which faces towards the first end of the tube and which includes a central bore having a circumferential edge for seating the tip connector of the e-cigarette;
  wherein the housing of the connection assembly comprises a body which has a first end with a first compartment for receiving the tip connector of the e-cigarette, and a second end with a second compartment containing the generally annular base of the outer contact; and
  each lug is slidably received in a respective guide passage which extends from the second compartment to the first compartment such that a free end of the lug is exposed in the first compartment.

2. The pack of claim 1, wherein the lugs comprise first to fourth lugs which are substantially equi-angularly spaced around the generally annular base of the outer contact.

3. The pack of claim 1, wherein the second end of the tube fits into and is held by the first compartment.

4. The pack of claim 3, wherein a side wall of the first compartment includes a step which limits a depth of insertion of the second end of the tube into the first compartment.

5. The pack of claim 1, wherein:
  the second compartment is generally annular and is separated from a central third compartment by a wall which guides movement of the generally annular base of the outer contact; and
  the third compartment contains a base of the central contact.

6. The pack of claim 5, wherein a central lug of the central contact projects through a passage in a transverse wall of the housing of the connection assembly separating the third compartment from the first compartment.

7. The pack of claim 5, wherein the housing of the connection assembly includes a base which closes the second compartment and which retains in position a spring of the outer contact.

8. The pack of claim 1, wherein a base of the central contact is spring-mounted relative to the housing of the connection assembly.

9. The pack of claim 7, wherein the base of the housing of the connection assembly closes the third compartment and retains in position a spring of the central contact.

10. The pack of claim 7, wherein the base of the housing of the connection assembly sits on an inner bottom wall surface of an outer case of the body of the pack.

11. The pack of claim 1, wherein inner side walls of the lugs are shaped such that a diameter of a gap between the inner side walls of the lugs tapers in a direction from the first end to the second end of the tube.

12. The pack of claim 1, wherein the free end is generally flat and the circumferential edge of the central bore is rounded in cross-section.

13. A system comprising:
  the pack of claim 1;
  an e-cigarette having a battery and a tip connector with a central contact and a generally annular outer contact for charging the battery of the e-cigarette;
  wherein the e-cigarette has a weight within a predetermined range of weights; and
  the spring-mounting of the outer contact of the connection assembly is arranged to deform resiliently under the weight of the e-cigarette when the tip connector of the e-cigarette is received substantially vertically downwards into the connection assembly, thereby establishing docking of the e-cigarette in the tube of the pack with the central contact of the e-cigarette being in electrical contact with the central contact of the connection assembly and with the outer contact of the e-cigarette being in electrical contact with the outer contact of the connection assembly.

14. The system of claim 13, wherein:
  a base of the central contact is spring-mounted relative to the housing of the connection assembly; and
  the spring-mounting of the central contact of the connection assembly is arranged to deform resiliently under the weight of the e-cigarette when the tip connector of the e-cigarette is received substantially vertically downwards into the connection assembly.

15. The system of claim 14, wherein:
  the e-cigarette has a length within a predetermined range of lengths;
  a lid is pivotably mounted on the body of the pack; and
  when the e-cigarette is received in the tube of the pack and when the lid is closed, the lid presses on the end of the e-cigarette remote from the tip connector and maintains the resilient deformation of the spring-mounting of the outer contact and the central contact of the connection assembly.

* * * * *